(12) United States Patent
Sugishita

(10) Patent No.: US 8,228,524 B2
(45) Date of Patent: Jul. 24, 2012

(54) IMAGE PROCESSING APPARATUS, DEVICE CONTROL PROGRAM, AND POWER CONTROL METHOD

(75) Inventor: Satoru Sugishita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1156 days.

(21) Appl. No.: 11/827,792

(22) Filed: Jul. 13, 2007

(65) Prior Publication Data

US 2008/0049250 A1    Feb. 28, 2008

(30) Foreign Application Priority Data

Jul. 13, 2006 (JP) ................................ 2006-192963
Apr. 19, 2007 (JP) ................................ 2007-110854

(51) Int. Cl.
*G06K 15/00* (2006.01)
*G03G 15/00* (2006.01)

(52) U.S. Cl. ............. 358/1.14; 399/37; 399/88; 399/89; 399/90; 713/300; 713/310; 713/320; 713/324

(58) Field of Classification Search .................. 358/1.14; 399/37, 88, 89, 90; 713/300, 310, 320, 324
See application file for complete search history.

(56) References Cited

U.S. PATENT DOCUMENTS

| | | | |
|---|---|---|---|
| 7,330,677 B2 * | 2/2008 | Ogura | .............................. 399/88 |
| 2003/0163747 A1 * | 8/2003 | Yoshikawa | ..................... 713/323 |
| 2004/0175200 A1 * | 9/2004 | Namura | .......................... 399/88 |
| 2006/0066898 A1 * | 3/2006 | Matsuda et al. | ............. 358/1.15 |
| 2007/0041047 A1 | 2/2007 | Sugishita | |
| 2007/0277048 A1 * | 11/2007 | Yamasaki | ..................... 713/310 |

FOREIGN PATENT DOCUMENTS

| | | |
|---|---|---|
| JP | 2005-124132 | 5/2005 |
| JP | 2005-215628 | 8/2005 |
| JP | 2005-303978 A | 10/2005 |

OTHER PUBLICATIONS

May 31, 2011 Japanese official action in connection with a counterpart Japanese patent application.

* cited by examiner

*Primary Examiner* — Twyler Haskins
*Assistant Examiner* — Fred Guillermety
(74) *Attorney, Agent, or Firm* — Cooper & Dunham LLP

(57) ABSTRACT

An image processing apparatus is provided that includes plural devices, a device control unit associated with each of the devices for controlling a power status of each of the devices according to a relevant power mode, and power mode setting unit for setting the relevant power mode to the device control unit.

19 Claims, 20 Drawing Sheets

IMAGE PROCESSING APPARATUS, DEVICE CONTROL PROGRAM, AND POWER CONTROL METHOD

BACKGROUND

1. Technical Field

This disclosure relates to an image processing apparatus, a device control program, and a power control method.

2. Description of the Related Art

Image processing apparatuses are known in the prior art that are adapted to operate in plural power modes in order to reduce the power consumption rate. For example, Japanese Laid-Open Patent Publication No. 2005-215628 discloses a technique related to an image processing apparatus that is capable of detailed power saving control with respect to each image processing function to be executed by determining a part that may be operated in power saving mode depending on the input mode of a processing image and the output mode of the processing image.

Also, Japanese Laid-Open Patent Publication No. 2005-303978 discloses a technique related to an image forming apparatus that uses two different CPUs for normal mode and power saving mode. In normal mode, a main CPU controls a sub CPU to perform data transmission/reception, and in power saving mode, the sub CPU performs data transmission/reception. Further, in the case of switching from normal mode to power saving mode, the main CPU directs the sub CPU to switch to power saving mode and the sub CPU undergoes a smooth transition to take control of data transmission/reception operations according to directions from the main CPU. In this way, communication may not be interrupted upon switching between power saving mode and normal mode in an image forming apparatus.

It is noted that energy efficiency standard values for OA apparatuses are established by the International Energy Star Program. Specifically, the International Energy Start Program defines power modes such as normal mode, low power mode, off mode, and sleep mode for each of OA apparatuses including a computer, a display, a scanner, a facsimile machine, and a multifunction machine, for example.

However, the above-disclosed techniques are not adapted for cases in which devices to be included in the image processing apparatus are not determined beforehand, and techniques for controlling each of plural devices connected to the image processing apparatus according to their power modes are not taken into account.

For example, there are cases in which a device of an image processing apparatus of a same apparatus model is varied depending on its grade or preferences of the user, for example. Particularly, with respect techniques related to an image forming apparatus corresponding to one type of image processing apparatus, it is becoming quite common to customize an image forming apparatus by selectively incorporating devices including main devices such as a scanner and a plotter according to preferences of each user, for example.

When power control methods according to the prior art are used in such an image forming apparatus, since the device to be connected is not determined beforehand, software for power status control has to be developed for each possible combination of devices that may be connected. In this case, when the number of connectable devices is increased, the number of possible combinations of such devices is exponentially increased accordingly, and in turn, the number of necessary types of software is increased as well. However, if detailed software development is performed for each user, the number of each type of apparatus produced with each combination of software may become smaller. Thus, if software is developed with respect to each combination, development costs may be increased and the required time for development may be increased, for example.

BRIEF SUMMARY

In an aspect of this disclosure, there is provided an approach for controlling the power status of devices included in an image processing apparatus that involves adding/changing device control units in conjunction with an addition/change of a device.

In another aspect, an image processing apparatus is provided that includes plural devices;

a device control unit associated with each of the devices to control a power status of each of the devices according to a relevant power mode; and a power mode setting unit configured to set the relevant power mode to the device control unit.

In another aspect of this disclosure, a power control method is provided for controlling power of an image processing apparatus that includes plural devices and a device control unit associated with each of the devices, the method including:

a device controlling step for controlling a power status of each of the devices according to a relevant power mode of the image processing apparatus; and a power mode setting step for setting the relevant power mode to the device control unit.

DESCRIPTION OF THE PREFERRED EMBODIMENTS

Figure 1:
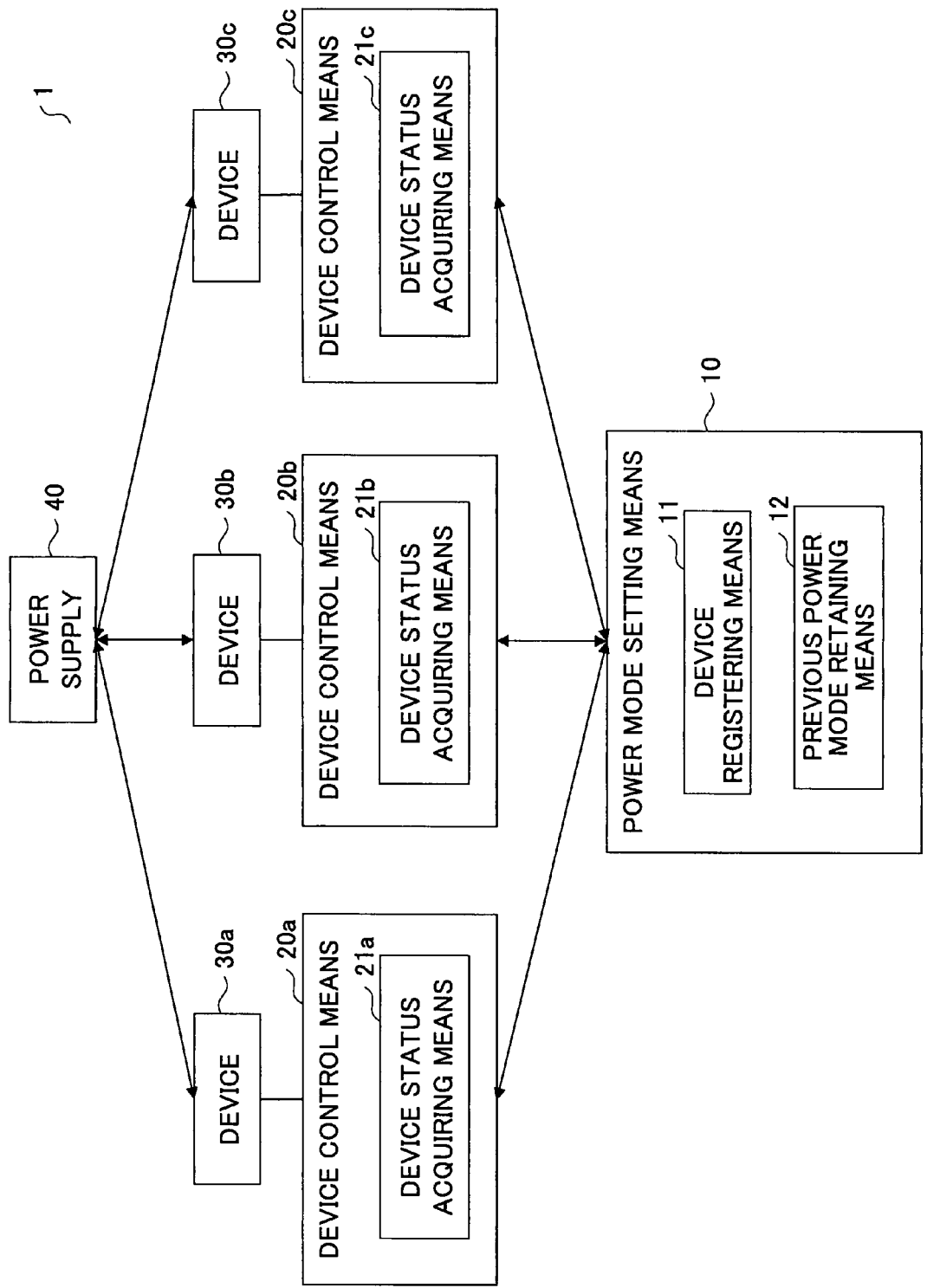
FIG. 1 is a block diagram illustrating an exemplary functional configuration of an image processing apparatus according to a first embodiment of the present invention.

In the following, preferred embodiments of the present invention are described with reference to the accompanying drawings.

(International Energy Star Program)

The International Energy Star Program that defines power efficiency modes of OA apparatuses is described below. For example, the International Energy Star Program defines normal mode, low power mode, and sleep mode as power modes of a multifunction machine, and further defines off mode in addition to the above-mentioned power modes for a digital copier with extended functions as one type of the multifunction machine.

The low power mode of a multifunction machine is the first low power status to which the power mode is automatically switched after output operations are not performed for a predetermined period of time which lower power status is realized without receiving information from an input source. In low power mode, a delay may occur in output operations of an image, but a delay may not occur in receiving information from the input source.

Also, the sleep mode of a multifunction machine is a second low power status to which the power mode is automatically switched after output operations are still not performed for a predetermined period of time after switching to the lower power mode which low power status is realized without turning off the power. In sleep mode, delays may occur in output operations of an image and reception of information from an input source.

Also, the off mode of a digital copier with extended functions is a power off status to which the power mode is automatically switched by an automatic power off function when the digital copier with the extended function is suitably connected to a power supply.

In the following descriptions, power modes of a multifunction machine according to standards defined by the International Energy Star Program are described as illustrative examples of power mode settings of an image processing apparatus according to an embodiment of the present invention. However, the present invention is not limited to implementation of the International Energy Star Program, and may equally be applied to any image processing apparatus that implements power saving mode settings.

Also, it is noted that in order to improve usability, power mode switching may not be performed on a main device in certain cases depending on the type of the main device or its attribute and the status of the device. For example, power mode switching may not be performed when a scanner device is performing scanning operations. Also, power mode switching may not be performed when a plotter device is performing printing operations, but the power switching may be retried after the elapse of a predetermined time period, for example.

Also, when a HDD device is performing write operations or read operations, or when a communications device is performing communication operations, power switching to a power status corresponding to off mode may not be performed but power switching to a power status corresponding to low power mode or sleep mode may be performed. In a case where power switching to off mode cannot be performed, the power switching may be retried after the elapse of a predetermined time period.

It is noted that the above-described power mode setting conditions are merely illustrative examples, and an image processing apparatus according to an embodiment of the present invention is not limited to setting such conditions so long as it is adapted to implement plural power mode settings.

[First Embodiment]

(FIG. 1)

FIG. 1 is a block diagram illustrating an exemplary functional configuration of an image processing apparatus according to a first embodiment of the present invention. In the image processing apparatus 1 of FIG. 1 the power status of one or more devices is controlled by corresponding device control means according to power mode setting conditions set by power mode setting means. The image processing apparatus 1 includes power mode setting means 10, device control means 20a-20c, devices 30a-30c, and a power supply 40.

The power mode setting means 10 is for setting the power modes of the image processing apparatus 1. For example, the power mode setting means 10 may set power modes of the image processing apparatus 1 according to the International Energy Start Program. The power mode setting means 10 includes devices registering means 11 and previous power mode retaining means 12.

The device registering means 11 is for registering a device that is connected to the image processing apparatus 1. The device registering means 11 registers device 30 based on a registration request from the device control means 20 associated with this device 30. The previous power mode retaining means 12 is for retaining the previous power mode of the image processing apparatus 1 set right before the current power mode that is specified in a power status change request conveyed from the power setting means 10 to the device control means 20.

The device control means 20a-20c are for controlling the devices 30a-30c, respectively. Specifically, the device control means 20a-20c are configured to set the power statuses of their corresponding devices 30a-30c based on power mode settings acquired from the power mode setting means 10. The power status corresponding to the power mode set by the power mode setting means 10 may vary depending on each device. Thus, each device control means 20 controls the power status of its corresponding device 30 based on the power mode set by the power mode setting means 10.

The device control means 20a-20c includes device status acquiring means 21a-21c, respectively. The device status acquiring means 21a-21c are for acquiring statuses of the devices 30a-30c, respectively. When the status of the device 30 acquired by the device status acquiring means 21 is not consistent with the power mode acquired from the power mode setting means 10, the device control means 20 does not perform power status change operations for changing the power status of the device 30 and conveys a power status change rejection signal to the power mode setting means 10.

For example, power mode switching may not be performed during scanning operations of the scanning device or plotting operations of the plotting device. Thus, when device status acquiring means 21 of device control means 20 for a scanner device acquires status information indicating that scanning operations are currently performed, the device control means 20 conveys a power status change rejection signal to the power mode setting means 10. Also, when device status acquiring means 21 of device control means 20 for a plotter device acquires status information indicating that plotting operations are currently performed, the device control means 20 conveys a power status change rejection signal to the power mode setting means 10. In one preferred embodiment, when it is determined that plotting operations are currently performed, the power mode setting means 10 may retry power mode setting (changing) after the elapse of a predetermined time period, for example.

The devices 30a-30c are for realizing various functions of the image processing apparatus 1 and are controlled by device control means 20a-20c, respectively. The power supply 40 is for supplying power to the image processing apparatus 1.

It is noted that the devices to be controlled based on the power mode set by the power mode setting means 10 and the corresponding device control means are not limited to the three devices and device control means shown in the illustrated example of FIG. 1; that is, any plural number of devices and device control means according to the functions of the image processing apparatus may be provided in an image processing apparatus according to an embodiment of the present invention.

(Correspondence of Units of FIGS. 2-8 to FIG. 1)

Power monitoring units 100-120 shown in FIGS. 2-8 correspond to the power mode setting means 10 of FIG. 1. Device control units 200a-200c, plotter control units 210a and 220a, scanner control units 210b and 220b, a HDD control unit 200c, and a network device 220d may correspond to any of the device control means 20a-20c of FIG. 1.

(FIG. 2)

Figure 2:
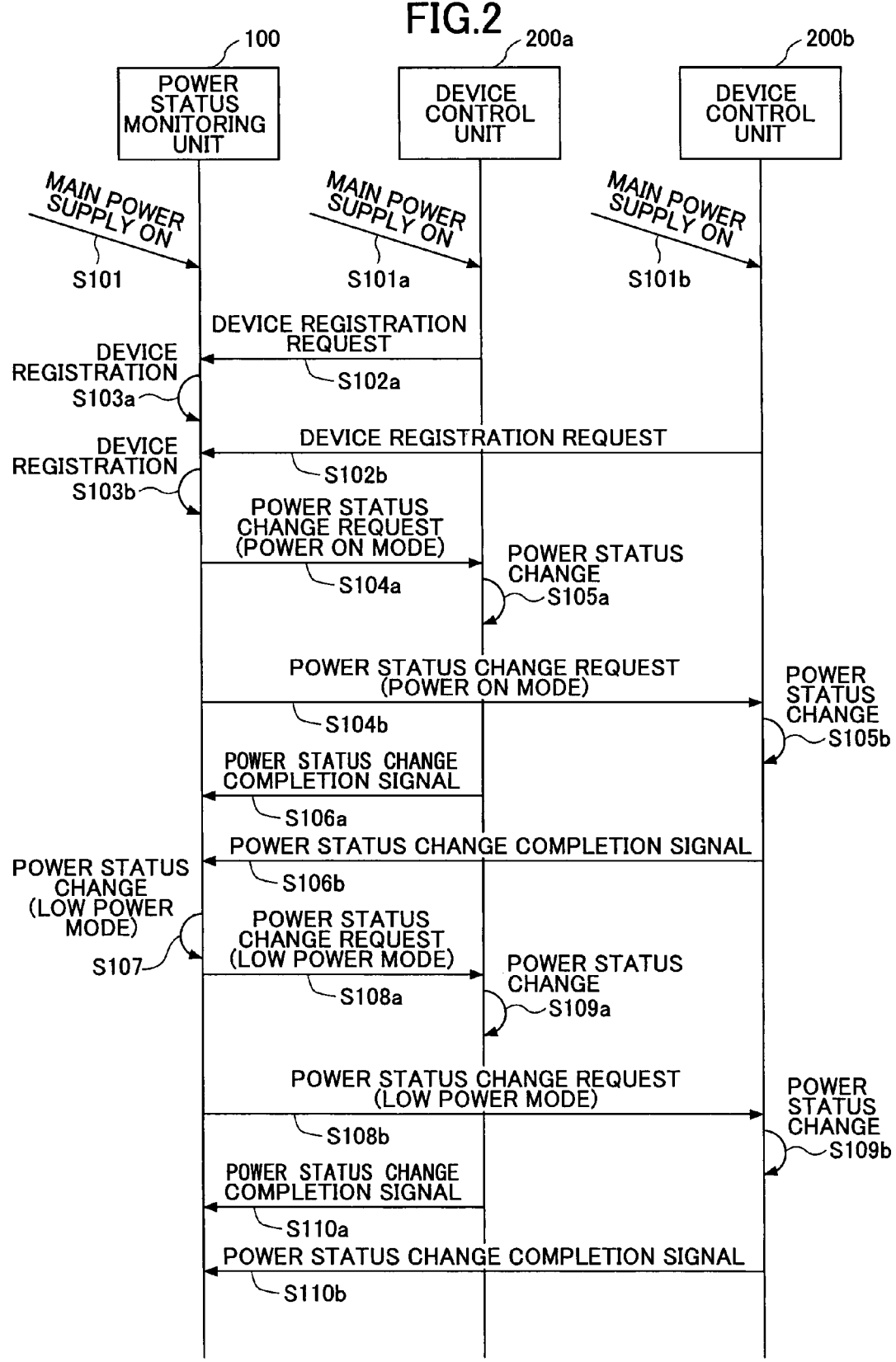
FIG. 2 is a sequence chart illustrating an exemplary process sequence for controlling the power status of the image processing apparatus according to the first embodiment.

FIG. 2 is a sequence chart illustrating a basic power control process sequence of an image processing apparatus according to an embodiment of the present invention. According to the illustrated example of FIG. 2, when a main power supply of the image processing apparatus is turned on, devices connected to the image processing apparatus are registered and a relevant power mode is set. In FIG. 2, power mode setting of the image processing apparatus is realized by having the device control units 200a and 200b exchange requests and responses with the power monitoring unit 100. It is noted that in the present embodiment, process steps S101a-S110a related to the device control unit 200a and process steps S101b-S110b related to the device control unit 200b are to be executed in the order in which they are indicated within their corresponding process sequences. On the other hand, the order in which the process sequence related to the device control unit 200a and the process sequence related to the device control unit 200b are performed does not necessarily have to be in the indicated order.

In step S101 of FIG. 2, the main power supply is turned on and the power monitoring unit 100 is activated. In steps S101a and S101b that may be performed at the same time as step S101 or after S101, the device control unit 200a is activated (S101a) and the device control unit 200b is activated (S101b).

In the process sequence related to the device control unit 200a, after step S101a, the process moves on to step S102a where the device control unit 200a conveys a registration request to the power status monitoring unit 100. After step S102a, the process moves on to step S103a where device registering means of the power status monitoring unit 100 registers the device control unit 200a.

In the process sequence related to the device control unit 200b, after step S101b, the process moves on to step S102b where the device control unit 200b conveys a registration request to the power monitoring unit 100. After step S102b, the process moves on to step S103b where device registering means of the power status monitoring unit 100 registers the device control unit 200b.

It is noted that in the registration requesting steps S102a and S102b, the device control units 200a and 200b convey predetermined information to the power status monitoring unit 100. The predetermined information may be information on the type of device controlled by the device controlling units 200a and 200b or attributes associated therewith, for example. Attributes of a device may be information indicating whether to retry setting of the power status after the elapse of a predetermined time period in a case where the power status is reset to the previous power status owing to the fact that the current status of the device is not consistent with the power mode set by the power monitoring unit 100, for example.

In the process sequence related to the device control unit 200a, after step S103a, the process moves on to step S104a where the power monitoring unit 100 conveys a power status change request to the device control unit 200a for switching to a power status corresponding to power on mode. After step S104a, the process moves on to step S105a where the device control unit 200a sets the power status of its corresponding device 300a (not shown) to power on mode.

In the process sequence related to the device control unit 200b, after step S103b, the process moves on to step S104b where the power monitoring unit 100 conveys a power status change request to the device control unit 200b for switching to a power status corresponding to power on mode. After step S104b, the process moves on to step S105b where the device control unit 200b sets the power status of its corresponding device 300b (not shown) to power on mode.

In the process sequence related to the device control unit 200a, after step S105a, the process moves on to step S106a where the device control unit 200a conveys a power status change completion signal to the power status monitoring unit

100 indicating that the power status of the device 300*a* has been switched to power on mode.

In the process sequence related to the device control unit 200*b*, after step S105*b*, the process moves on to step S106*b* where the device control unit 200*b* conveys a power status change completion signal to the power status monitoring unit 100 indicating that the power status of the device 300*b* has been switched to power on mode.

The above process sequences from step S101 to step S106*a* and from step S101 to step S106*b* illustrate transitions of the power status of devices from the time the main power supply of the image processing apparatus 1 is turned on until the devices are activated and switched to power on mode.

In the following, exemplary process sequences are described of a case in which the image processing apparatus 1 is switched from power on mode to low power mode. In step S107, the power status monitoring unit 100 sets the power mode to low power mode. In one example, the power status monitoring unit 100 may set the power mode to low power mode when output operations are not performed for a predetermined period of time in normal mode.

In the process sequence related to the device control unit 200*a*, after step S107, the process moves on to step S108*a* where the power monitoring unit 100 conveys a power status change request to the device control unit 200*a* for changing the power status of its corresponding device 300*a* to low power mode. After step S108*a*, the process moves on to step S109*a* where the device control unit 200*a* switches the power status of its corresponding device 300*a* (not shown) to low power mode.

In the process sequence related to the device control unit 200*b*, after step S107, the process moves on to step S108*b* where the power monitoring unit 100 conveys a power status change request to the device control unit 200*b* for changing the power status of its corresponding device 300*b* to low power mode. After step S108*b*, the process moves on to step S109*b* where the device control unit 200*b* switches the power status of its corresponding device 300*b* (not shown) to low power mode.

After step S109*a*, the process moves on to step S110*a* where the device control unit 200*a* conveys a power status change completion signal to the power status monitoring unit 100 indicating that the power status of the device 300*a* has been switched to low power mode.

After step S109*b*, the process moves on to step S110*b* where the device control unit 200*b* conveys a power status change completion signal to the power status monitoring unit 100 indicating that the power status of the device 300*b* has been switched to low power mode.

According to one example, in steps S105*a*, S105*b*, S109*a*, and S109*b*, the device control units 200*a* and 200*b* may be configured to change the power statuses of their corresponding devices 300*a* and 300*b* when the power statuses of theses devices acquired by device status acquiring means of the device control units 200*a* and 200*b* are different from the power statuses specified in corresponding power status change requests from the power status monitoring unit 100.

(FIG. 3)

Figure 3:
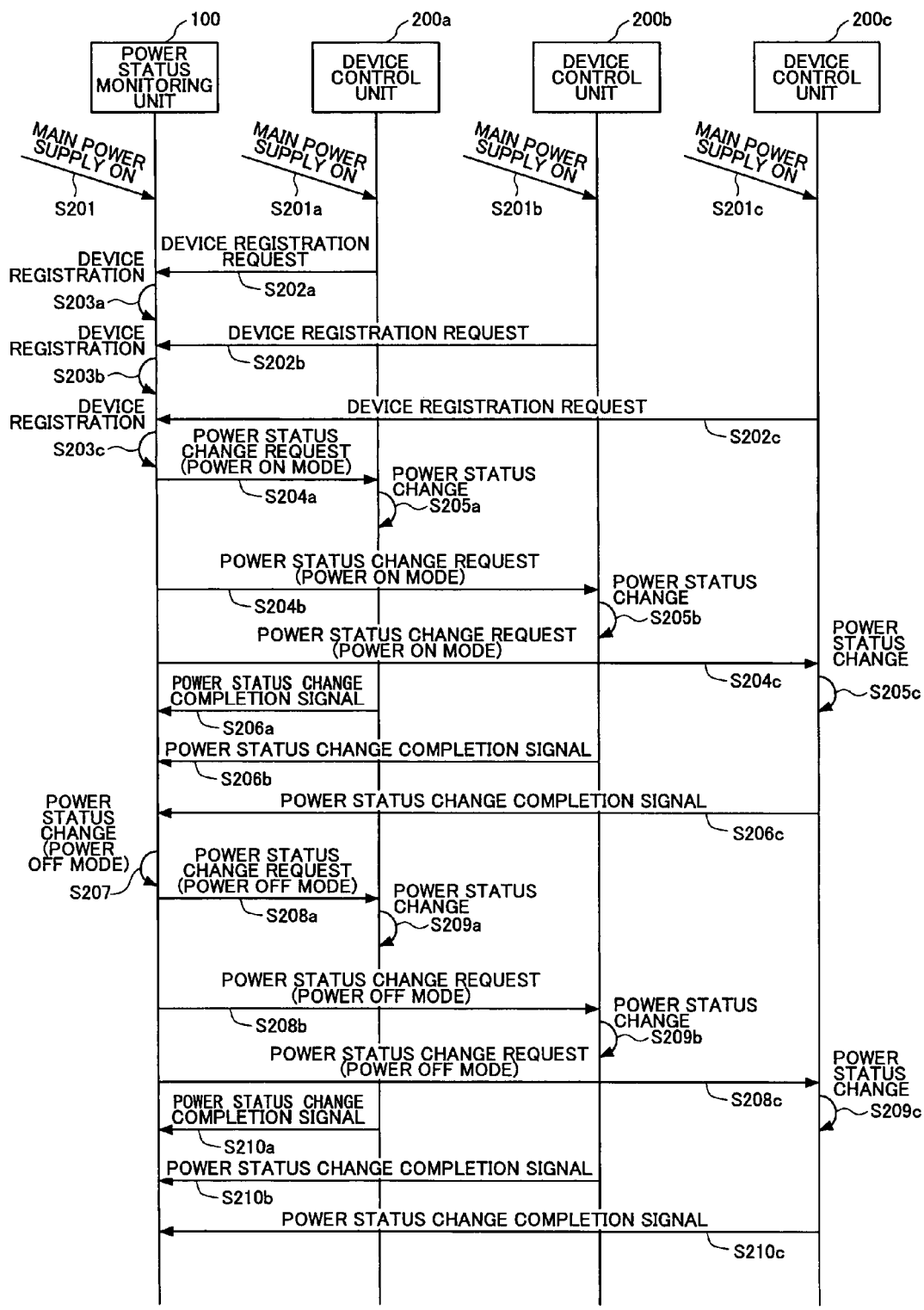
FIG. 3 is a sequence chart illustrating an exemplary process sequence of the image processing apparatus according to the first embodiment in a case where the image processing apparatus includes three device control units.

FIG. 3 is a sequence chart illustrating a case in which three device control units 200*a*-200*c* are provided. In the illustrated example of FIG. 3, power mode setting of the image processing apparatus 1 is realized by having the device control units 200*a*, 200*b*, and 200*c* exchange requests and responses with the power status monitoring unit 100. It is noted that process steps S201*a*-S210*a* related to the device control unit 200*a*, process steps S201*b*-S210*b* related to the device control unit 200*b*, and process steps S201*c*-S210*c* related to the device control unit 200*c* are to be executed in the order in which they are indicated within their corresponding process sequences. On the other hand, the order in which the process sequence related to the device control unit 200*a*, the process sequence related to the device control unit 200*b*, and the process sequence related to the device control unit 200*c* are performed does not necessarily have to be in the indicated order.

Also, it is noted that the process steps S201*a*-S206*a* and S208*a*-S210*a* of FIG. 3 related to the device control unit 200*a* and the process steps S201*b*-S206*b* and S208*b*-S210*b* of FIG. 3 related to the device control unit 200*b* are substantially identical to the process steps S101*a*-S106*a* and S108*a*-S110*a* of FIG. 2 related to the device control unit 200*a* and the process steps S101*b*-S106*b* and S108*b*-S110*b* of FIG. 2 related to the device control unit 200*b*. In other words, the process sequences of FIG. 3 are substantially identical to those illustrated in FIG. 2 aside from the fact that in FIG. 3, the power mode is set to power off mode instead of low power mode. Thus, descriptions of the process sequences related to the device control units 200*a* and 200*b* are omitted.

In the process sequence related to the device control unit 200*c*, in step S201, the main power supply is turned on and the power status monitoring unit 100 is activated, and in step S201*c* that is performed at the same time as step S201 or after S201, the device control unit 200*c* is activated.

After step S201*c*, the process moves on to step S202*c* where the device control unit 200*c* conveys a registration request to the power status monitoring unit 100. After step S202*c*, the process moves on to step S203*c* where device registering means of the power status monitoring unit 100 registers the device control unit 200*c*.

After step S203*c*, the process moves on to step S204*c* where the power monitoring unit 100 conveys a power status change request to the device control unit 200*c* for switching to a power status corresponding to power on mode. After step S204*c*, the process moves on to step S205*c* where the device control unit 200*c* sets the power status of its corresponding device 300*c* (not shown) to power on mode.

After step S205*c*, the process moves on to step S206*c* where the device control unit 200*c* conveys a power status change completion signal to the power status monitoring unit 100 indicating that the power status of the device 300*c* has been switched to power on mode.

The process sequences from step S201 to step S206*a*, from step 201 to step S206*b*, and from step S201 to step S206*c* are related to transitions of the power status of devices from the time the main power supply of the image processing apparatus 1 is turned on until the devices are activated and switched to power on mode.

In the following, exemplary process sequences are described of a case in which the image processing apparatus 1 is switched from power on mode to power off mode. In step S207, the power status monitoring unit 100 sets the power mode to power off mode. In one example, the power status monitoring unit 100 may set the power mode to power off mode when output operations are not performed for a predetermined period of time in low power mode.

In the process sequence related to the device control unit 200*c*, after step S207, the process moves on to step S208*c* where the power monitoring unit 100 conveys a power status change request to the device control unit 200*c* for switching to a power status corresponding to power off mode. After step S208*c*, the process moves on to step S209*c* where the device control unit 200*c* switches the power status of its corresponding device 300*c* (not shown) to power off mode.

After step S209*c*, the process moves on to step S210*c* where the device control unit 200*c* conveys a power status change completion signal to the power status monitoring unit 100 indicating that the power status of the device 300*c* has been switched to power off mode.

According to one example, in steps S205*a*, S205*b*, S205*c*, S209*a*, S209*b*, and S209*c*, the device control units 200*a*-200*c* may be configured to change the power statuses of their corresponding devices 300*a*-300*c* when the power statuses of theses devices acquired by device status acquiring means of the device control units 200*a*-200*c* are different from the power statuses specified in corresponding power status change requests from the power status monitoring unit 100.

(FIG. 4)

Figure 4:
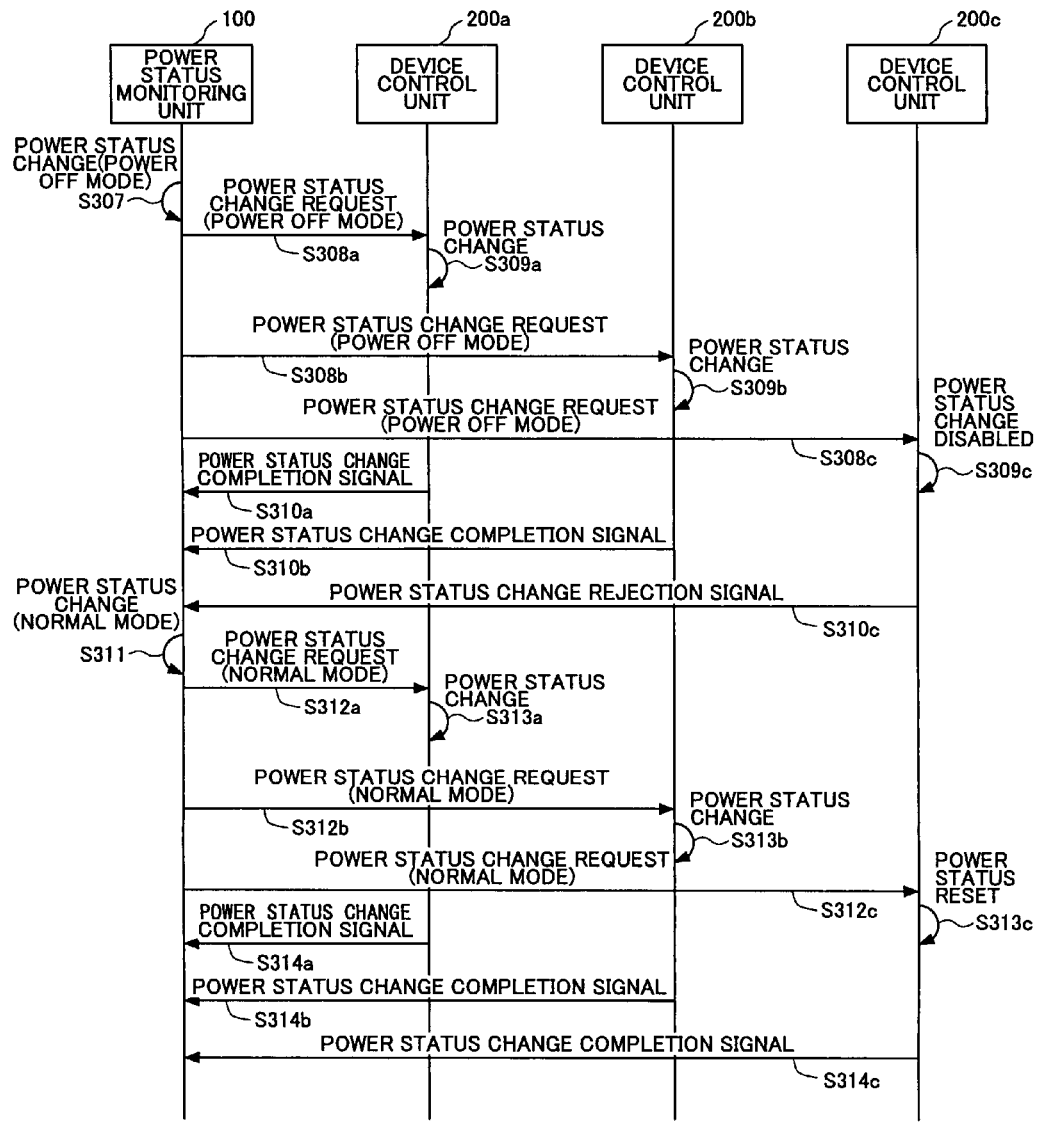
FIG. 4 is a sequence chart illustrating an exemplary process sequence of the image processing apparatus according to the first embodiment in a case where the power status of a device cannot be changed to the requested power status.

FIG. 4 is a sequence chart illustrating a case in which the status of a device acquired by device status acquiring means of a device control unit is not consistent with the power status requested by the power status monitoring unit. For example, the process sequence of FIG. 4 may be performed after the main power supply is turned on and the power statuses of the devices 300*a*-300*c* are set to normal mode.

It is noted that in the illustrated example of FIG. 4 power mode setting of an image processing apparatus may be realized by having the device control units 200*a*-200*c* exchange requests and responses with the power status monitoring unit 100. Also, in FIG. 4, process steps S308-S314 of a process sequence related to the device control unit 200*a*, process steps S308*b*-S314*b* of a process sequence related to the device control unit 200*b*, and process steps S308*c*-S314*c* of a process sequence related to the device control unit 200*c* are to be executed in the order in which they are indicated within their corresponding process sequences. On the other hand, the order in which the process sequence related to the device control unit 200*a*, the process sequence related to the device control unit 200*b*, and the process sequence related to the device control unit 200*c* are performed does not necessarily have to be in the indicated order.

In step S307, the power status monitoring unit 100 sets the power mode to power off mode. For example, the power status monitoring unit 100 may set the power mode to power off mode when output operations are not performed for a predetermined period of time in low power mode.

In the process sequence related to the device control unit 200*a*, after step S307, the process moves on to step S308*a* where the power monitoring unit 100 conveys a power status change request to the device control unit 200*a* for switching to a power status corresponding to power off mode. After step S308*a*, the process moves on to step S309*a* where the device control unit 200*a* switches the power status of its corresponding device 300*a* (not shown) to power off mode.

In the process sequence related to the device control unit 200*b*, after step S307, the process moves on to step S308*b* where the power monitoring unit 100 conveys a power status change request to the device control unit 200*b* for switching to a power status corresponding to power off mode. After step S308*b*, the process moves on to step S309*b* where the device control unit 200*b* switches the power status of its corresponding device 300*b* (not shown) to power off mode.

In the process sequence related to the device control unit 200*c*, after step S307, the process moves on to step S308*c* where the power monitoring unit 100 conveys a power status change request to the device control unit 200*c* for switching to a power status corresponding to power off mode. After step S308*c*, the process moves on to step S309*c* where the device control unit 200*c* attempts to switch the power status of its corresponding device 300*c* (not shown) to power off mode. However, power status change operations are canceled in the present case since the status of the device 300*c* acquired by the device status acquiring means of the device control unit 200*c* is not consistent with a power status corresponding to power off mode.

After step S309*a*, the process moves on to step S310*a* where the device control unit 200*a* conveys a power status change completion signal to the power status monitoring unit 100 indicating that the power status of the device 300*a* has been changed as requested.

After step S309*b*, the process moves on to step S310*b* where the device control unit 200*b* conveys a power status change completion signal to the power status monitoring unit 100 indicating that the power status of the device 300*b* has been changed as requested.

After step S309*c*, the process moves on to step S310*c* where the device control unit 200*c* conveys a power status change rejection signal to the power status monitoring unit 100 indicating that the power status of the device 300*c* cannot be changed as requested.

After signaling power status change rejection in step S310*c*, the process moves on to step S311 where the power status monitoring unit 100 sets the power mode to normal mode corresponding to the previous power mode before setting the power mode to power off mode. The previous power mode may be retained in the previous power mode retaining means 12 of the power status monitoring unit 100. In one example, the previous power mode retaining means 12 may be a storage unit of the image processing apparatus 1.

In the process sequence related to the device control unit 200*a*, after step S311, the process moves on to step S312*a* where the power status monitoring unit 100 conveys a power status change request to the device control unit 200*a* for switching to a power status corresponding to normal mode. After step S312*a*, the process moves on to step S313*a* where the device control unit 200*a* switches the power status of its corresponding device 300*a* (not shown) to normal mode.

In the process sequence related to the device control unit 200*b*, after step S311, the process moves on to step S312*b* where the power status monitoring unit 100 conveys a power status change request to the device control unit 200*b* for switching to a power status corresponding to normal mode. After step S312*b*, the process moves on to step S313*b* where the device control unit 200*b* switches the power status of its corresponding device 300*b* (not shown) to normal mode.

In the process sequence related to the device control unit 200*c*, after step S311, the process moves on to step S312*c* where the power status monitoring unit 100 conveys a power status change request to the device control unit 200*c* for switching to a power status corresponding to normal mode. After step S312*c*, the process moves on to step S313*c* where the device control unit 200*c* resets the power status of its corresponding device 300*c* (not shown) to normal mode.

It is noted that since the previous power status of the device 300*c* before performing step S313*c* corresponds to normal mode, the power status acquired by the device status acquiring means of the device control unit 200*c* corresponds to the requested power status. Thus, the device control unit 200*c* does not have to change the power status of the device 300*c* and may merely reset the power status to the same status as before in step S313*c*.

After step S313*a*, the process moves on to step S314*a* where the device control unit 200*a* conveys a power status change completion signal to the power status monitoring unit 100 indicating that the power status of the device 300*a* has been changed as requested.

After step S313*b*, the process moves on to step S314*b* where the device control unit 200*b* conveys a power status change completion signal to the power status monitoring unit 100 indicating that the power status of the device 300b has been changed as requested.

After step S313c, the process moves on to step S314c where the device control unit 200c conveys a power status change completion signal to the power status monitoring unit 100 indicating that the power status of the device 300c has been changed as requested.

It is noted that in one embodiment, the process steps S312c-S314c related status change operations of the device 300c may be omitted.

Also, in the process steps S309a, S309b, S313a, and S313b the device control units 200a and 200b may be configured to perform power status change operations on their corresponding devices 300a and 300b when the power statuses of the devices 300a and 300b acquired by their device status acquiring means are different from the requested power status, for example.

(FIG. 5)

Figure 5:
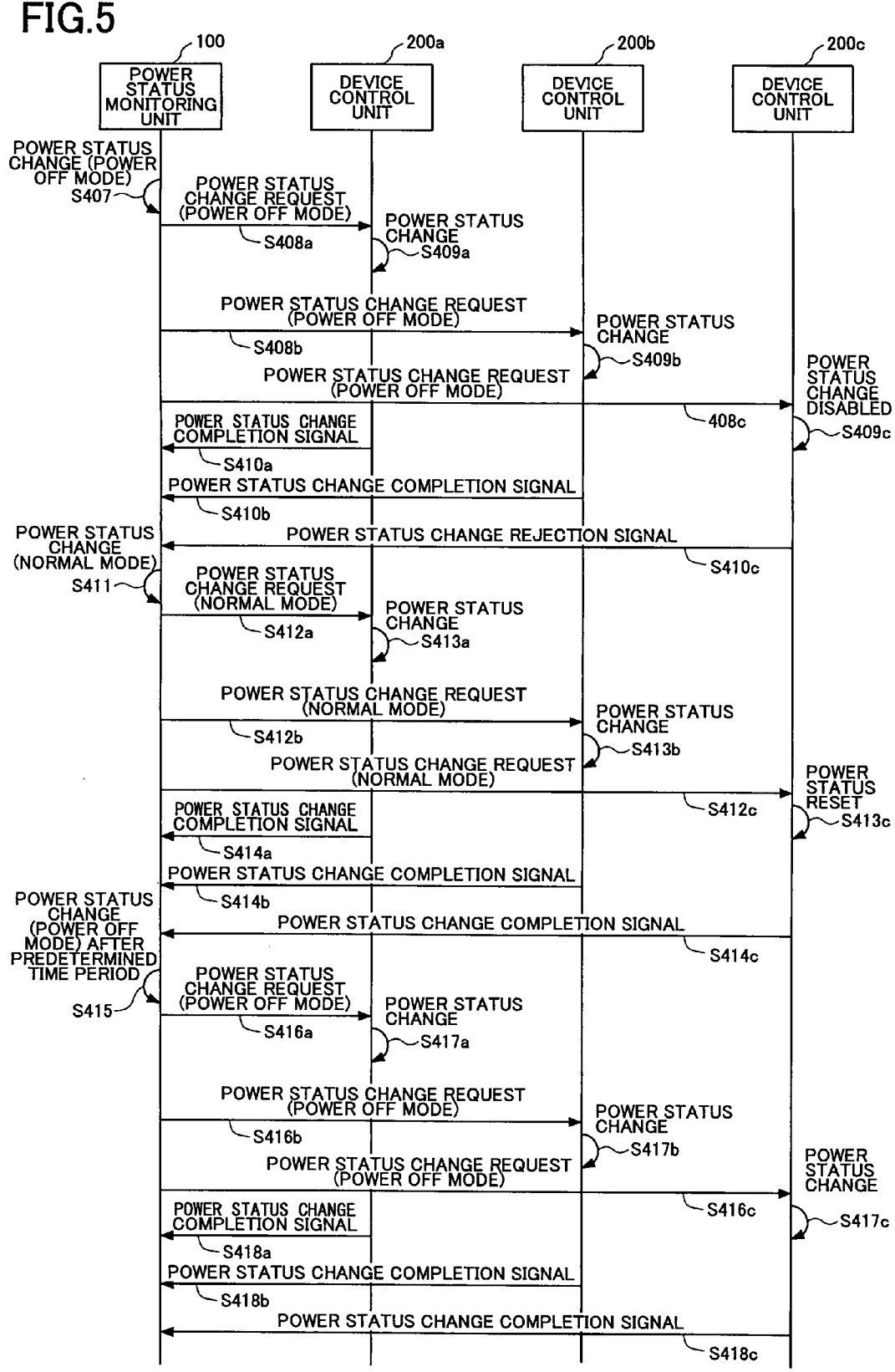
FIG. 5 is a sequence chart illustrating an exemplary process sequence of the image processing apparatus according to the first embodiment in a case where power mode setting operations are retried when the power status of a device cannot be changed the first time.

FIG. 5 is a sequence chart illustrating a case in which power mode setting operations are retried when the power status of a device cannot be changed as requested. For example, the illustrated process sequence of FIG. 5 may be performed after the main power supply is turned on and the devices 300a-300c are set to power statuses corresponding to normal mode.

In the example of FIG. 5, power mode setting of the image processing apparatus may be realized by having the device control units 200a-200c exchange requests and responses with the power status monitoring unit 100. It is noted that process steps S408a-S418a of a process sequence related to the device control unit 200a, process steps S408b-S418b of a process sequence related to the device control unit 200b, and process steps S408c-S418c of a process sequence related to the device control unit 200c are to be executed in the order in which they are indicated within their corresponding process sequences. On the other hand, the order in which the process sequence related to the device control unit 200a, the process sequence related to the device control unit 200b, and the process sequence related to the device control unit 200c are performed does not necessarily have to be in the indicated order.

Also, it is noted that the process steps S408a-S410a and S412a-S414a related to the device control unit 200a, the process steps S408b-S410b and S412b-S414b related to the device control unit 200b, and the process steps S408c-S410c and S412c-S414c related to the device control unit 200c are substantially identical to the process steps S308a-S310a and S312a-S314a related to the device control unit 200a, the process steps S308b-S310b and S312b-S314b related to the device control unit 200b, and the process steps S308c-S310c and S312c-S314c related to the device control unit 200c, respectively. Thus, descriptions of such process steps are omitted.

In step S415 that is performed after a predetermined time period elapses from the time power status change completion signals are issued in steps S414a-S414c, the power status monitoring unit 100 sets the power mode to power off mode once again. In one embodiment, the power status monitoring unit 100 may store information specifying the power mode it has attempted to set (i.e., power off mode in the present example) as the previous power mode in a storage unit of the power status monitoring unit 100, for example, and retry the power mode setting after a predetermined time period elapses.

In the process sequence related to the device control unit 200a, after step S415, the process moves on to step S416a where the power status monitoring unit 100 conveys a power status change request to the device control unit 200a for switching to a power status corresponding to power off mode. After step S416a, the process moves on to step S417a where the device control unit 200a switches the power status of its corresponding device 300a (not shown) to power off mode.

In the process sequence related to the device control unit 200b, after step S415, the process moves on to step S416b where the power status monitoring unit 100 conveys a power status change request to the device control unit 200b for switching to a power status corresponding to power off mode. After step S416b, the process moves on to step S417b where the device control unit 200b switches the power status of its corresponding device 300b (not shown) to power off mode.

In the process sequence related to the device control unit 200c, after step S415, the process moves on to step S416c where the power status monitoring unit 100 conveys a power status change request to the device control unit 200c for switching to a power status corresponding to power off mode. After step S416c, the process moves on to step S417c where the device control unit 200c switches the power status of its corresponding device 300c (not shown) to power off mode.

After step S417a, the process moves on to step S418a where the device control unit 200a conveys a power status change completion signal to the power status monitoring unit 100 indicating that the power status of the device 300a has been changed as requested.

After step S417b, the process moves on to step S418b where the device control unit 200b conveys a power status change completion signal to the power status monitoring unit 100 indicating that the power status of the device 300b has been changed as requested.

After step S417c, the process moves on to step S418c where the device control unit 200c conveys a power status change completion signal to the power status monitoring unit 100 indicating that the power status of the device 300c has been changed as requested.

It is noted that in the process steps S409a, S409b, S413a, S413b, S417a, S417b, and S417c, the device control units 200a-200c may be configured to change the power statuses of their corresponding devices 300a-300c when the power statuses of the devices 300a-300c acquired by the device status acquiring means of the device control units 200a-200c differ from the requested power status according to one embodiment.

(FIG. 6)

Figure 6:
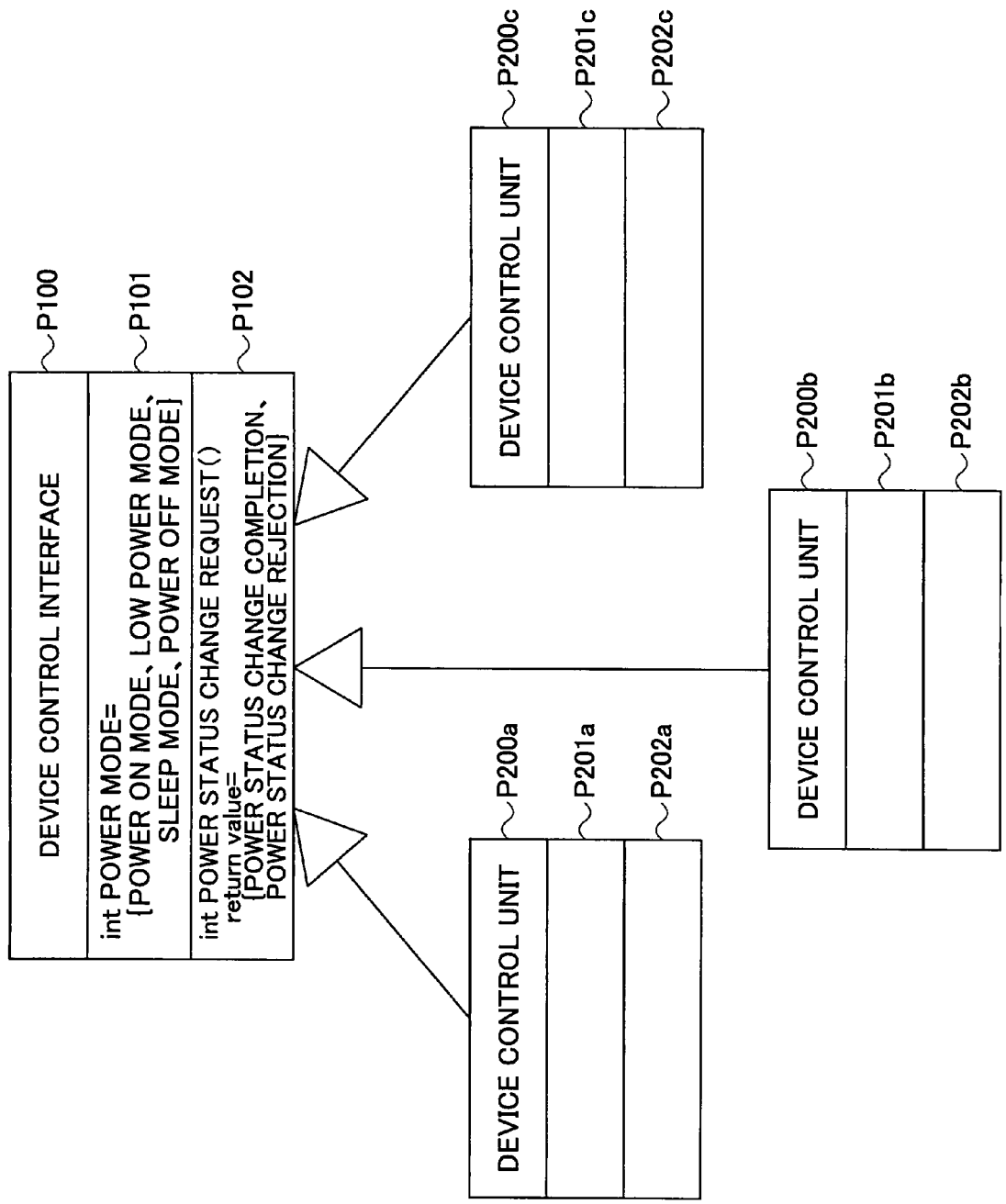
FIG. 6 is a diagram illustrating a configuration of a computer program according to an embodiment of the present invention.

FIG. 6 is a diagram illustrating an exemplary configuration of a device control program according to an embodiment of the present invention. In the illustrated example of FIG. 6, 'power mode' is defined as a common value in a device control interface part P100. The 'power mode' is equivalent to one of the values of 'power on mode', 'low power mode', 'sleep mode', and 'power off mode'. The value of the 'power mode' is inherited in device control programs P200a-P200c and reflected in P201a-201c.

To perform power mode setting or change operations, a power status change request is issued according to specifications described in P102 of the device control interface. Power status setting parts P202a-P202c of the device control programs P200a-P200c perform power status setting operations according to programs adapted for their corresponding devices and convey the operations results as return values to part P102 of the device control interface. Part P102 of the device control interface receives 'power status change completion' or 'power status change rejection' as return values.

It is noted that the device control interface P100 may be a program for enabling a computer to function as power mode setting means according to an embodiment of the present invention, and the device control parts P200a-P200c may be programs for enabling a computer to function as device control means according to an embodiment of the present invention.

(FIG. 7)

Figure 7:
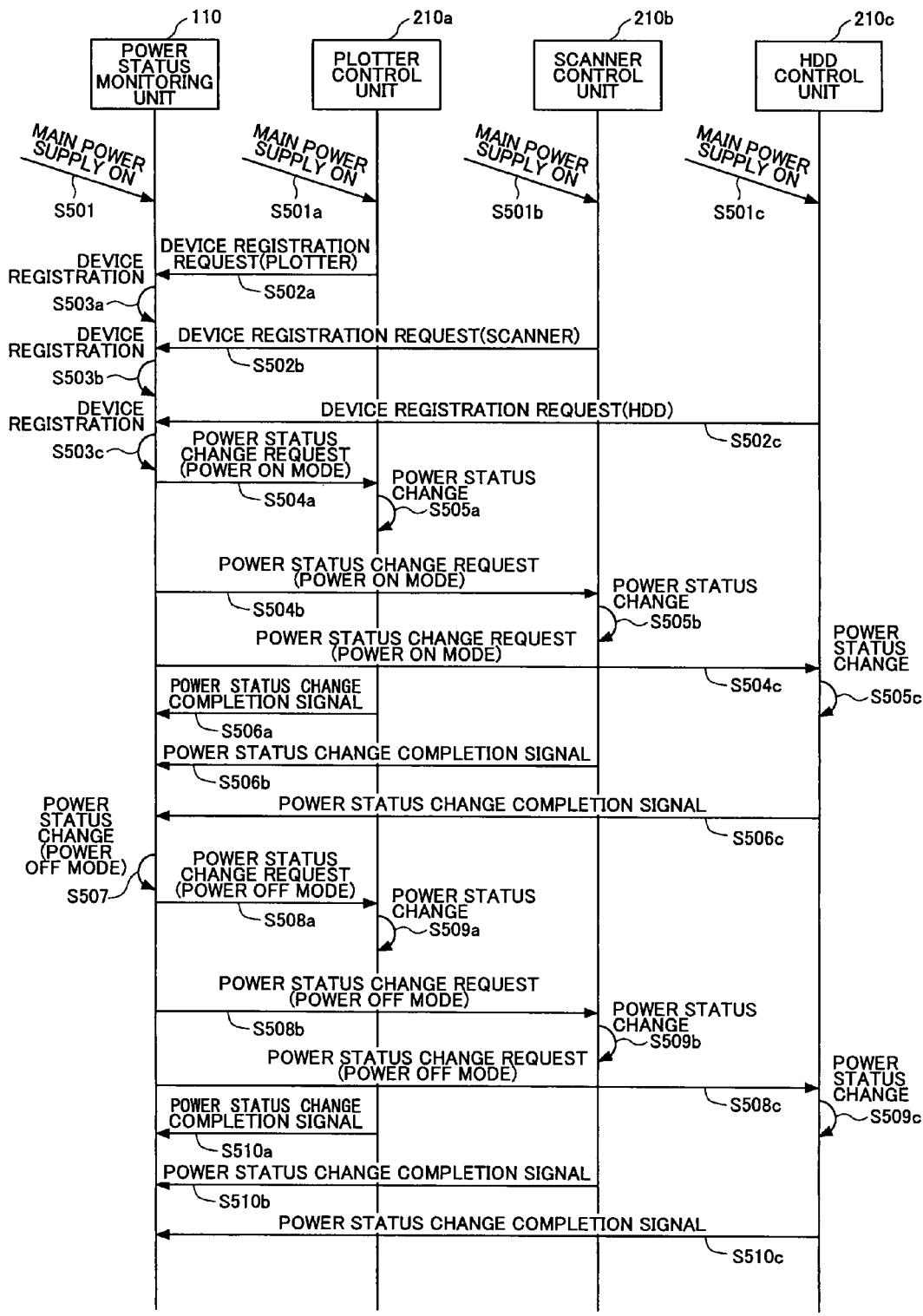
FIG. 7 is a sequence chart illustrating an exemplary process sequence for setting the power mode of a copier.

FIG. 7 is a sequence chart illustrating a process sequence for setting the power mode of a copier corresponding to an image processing apparatus according to an embodiment of the present invention. The copier of FIG. 7 includes a plotter 310a (not shown), a scanner 310b (not shown), and a HDD 310c (not shown) as devices to be controlled, and a plotter control unit 210a, a scanner control unit 210b, and a HDD control unit 210c as corresponding device control units.

In step S501 of FIG. 7, the main power supply of the copier is turned on and a power status monitoring unit 110 is activated. In steps S501a, S501b, and S501c that may be performed at the same time as step S501 or after step S501, the plotter control unit 210a, the scanner control unit 210b, and the HDD control unit 210c are activated, respectively.

In the process sequence related to the plotter control unit 210a, after step S501a, the process moves on to step S502a where the plotter control unit 210a conveys a registration request to the power status monitoring unit 110. After step S502a, the process moves on to step S503a where device registering means of the power status monitoring unit 110 registers the plotter control unit 210a.

In the process sequence related to the scanner control unit 210b, after step S501b, the process moves on to step S502b where the scanner control unit 210b conveys a registration request to the power status monitoring unit 110. After step S502b, the process moves on to step S503b where device registering means of the power status monitoring unit 110 registers the scanner control unit 210b.

In the process sequence related to the HDD control unit 210c, after step S501c, the process moves on to step S502c where the HDD control unit 210c conveys a registration request to the power status monitoring unit 110. After step S502c, the process moves on to step S503c where device registering means of the power status monitoring unit 110 registers the HDD control unit 210c.

In one embodiment, the plotter/scanner/HDD control units 210a-210c may convey predetermined information to the power status monitoring unit 110 in the registration requesting steps S502a-S502c. The predetermined information may be information on the type of device controlled by the device control unit or attributes of the device, for example. Attributes of a device may be information indicating whether power status change operations are to be retried after the elapse of a predetermined time period in a case where the status of the device is reset to a previous power status due to an inconsistency between the status of the device acquired by device status acquiring means and the requested power status.

In the process sequence related to the plotter control unit 210a, after step S503a, the process moves on to step S504a where the power status monitoring unit 110 conveys a power status change request to the plotter control unit 210a for switching to a power status corresponding to power on mode. After step S504a, the process moves on to step S505a where the plotter control unit 210a switches the power status of the plotter 310a (not shown) to power on mode.

In the process sequence related to the scanner control unit 210b, after step S503b, the process moves on to step S504b where the power status monitoring unit 110 conveys a power status change request to the scanner control unit 210b for switching to a power status corresponding to power on mode. After step S504b, the process moves on to step S505b where the scanner control unit 210b switches the power status of the scanner 310b (not shown) to power on mode.

In the process sequence related to the HDD control unit 210c, after step S503c, the process moves on to step S504c where the power status monitoring unit 110 conveys a power status change request to the HDD control unit 210c for switching to a power status corresponding to power on mode. After step S504c, the process moves on to step S505c where the HDD control unit 210c switches the power status of the HDD 310c (not shown) to power on mode.

In the process sequence related to the plotter control unit 210a, after step S505a, the process moves on to step S506a where the plotter control unit 210a conveys a power status change completion signal to the power status monitoring unit 110 indicating that the power status of the plotter 310a has been switched to power on mode as requested.

In the process sequence related to the scanner control unit 210b, after step S505b, the process moves on to step S506b where the scanner control unit 210b conveys a power status change completion signal to the power status monitoring unit 110 indicating that the power status of the scanner 310b has been switched to power on mode as requested.

In the process sequence related to the HDD control unit 210c, after step S505c, the process moves on to step S506c where the HDD control unit 210c conveys a power status change completion signal to the power status monitoring unit 110 indicating that the power status of the HDD 310c has been switched to power on mode as requested.

The above process sequences of S501-S506a, S501-S506b, and S501-S506c correspond to transitions of the power status from the time the main power supply of the copier is turned on to the time the devices of the copier are activated and switched to power on mode.

In the following, process sequences performed in a case where the copier is switched from power on mode to power off mode are described. In step S507, the power status monitoring unit 110 sets the power mode to power off mode. In one example, the power status monitoring unit 110 may set the power mode to power off mode when a power key is operated during normal mode.

In the process sequence related to the plotter control unit 210a, after step S507, the process moves on to step S508a where the power status monitoring unit 110 conveys a power status change request to the plotter control unit 210a for switching to a power status corresponding to power off mode. After step S508a, the process moves on to step S509a where the plotter control unit 210a switches the power status of the plotter 310a (not shown) to power off mode.

In the process sequence related to the scanner control unit 210b, after step S507, the process moves on to step S508b where the power status monitoring unit 110 conveys a power status change request to the scanner control unit 210b for switching to a power status corresponding to power off mode. After step S508b, the process moves on to step S509b where the scanner control unit 210b switches the power status of the scanner 310b (not shown) to power off mode.

In the process sequence related to the HDD control unit 210c, after step S507, the process moves on to step S508c where the power status monitoring unit 110 conveys a power status change request to the HDD control unit 210c for switching to a power status corresponding to power off mode. After step S508c, the process moves on to step S509c where the HDD control unit 210c switches the power status of the HDD 310c (not shown) to power off mode.

After step S509a, the process moves on to step S510a where the plotter control unit 210a conveys a power status change completion signal to the power status monitoring unit 110 indicating that the power status of the plotter 310*a* has been switched to power off mode as requested.

After step S509*b*, the process moves on to step S510*b* where the scanner control unit 210*b* conveys a power status change completion signal to the power status monitoring unit 110 indicating that the power status of the scanner 310*b* has been switched to power off mode as requested.

After step S509*c*, the process moves on to step S510*c* where the HDD control unit 210*c* conveys a power status change completion signal to the power status monitoring unit 110 indicating that the power status of the HDD 310*c* has been switched to power off mode as requested.

According to one embodiment, in steps S505*a*, S505*b*, S505*c*, S509*a*, S509*b*, and S509*c*, the plotter/scanner/HDD control units 210*a*-210*c* may be configured to change the statuses of the plotter 310*a*, the scanner 310*b*, and the HDD 310*c*, respectively, in the case where the power statuses of these devices 310*a*-310*c* acquired by device status acquiring means of the plotter/scanner/HDD control units 210*a*-210*c* are different from the requested power status.

(FIG. 8)

Figure 8:
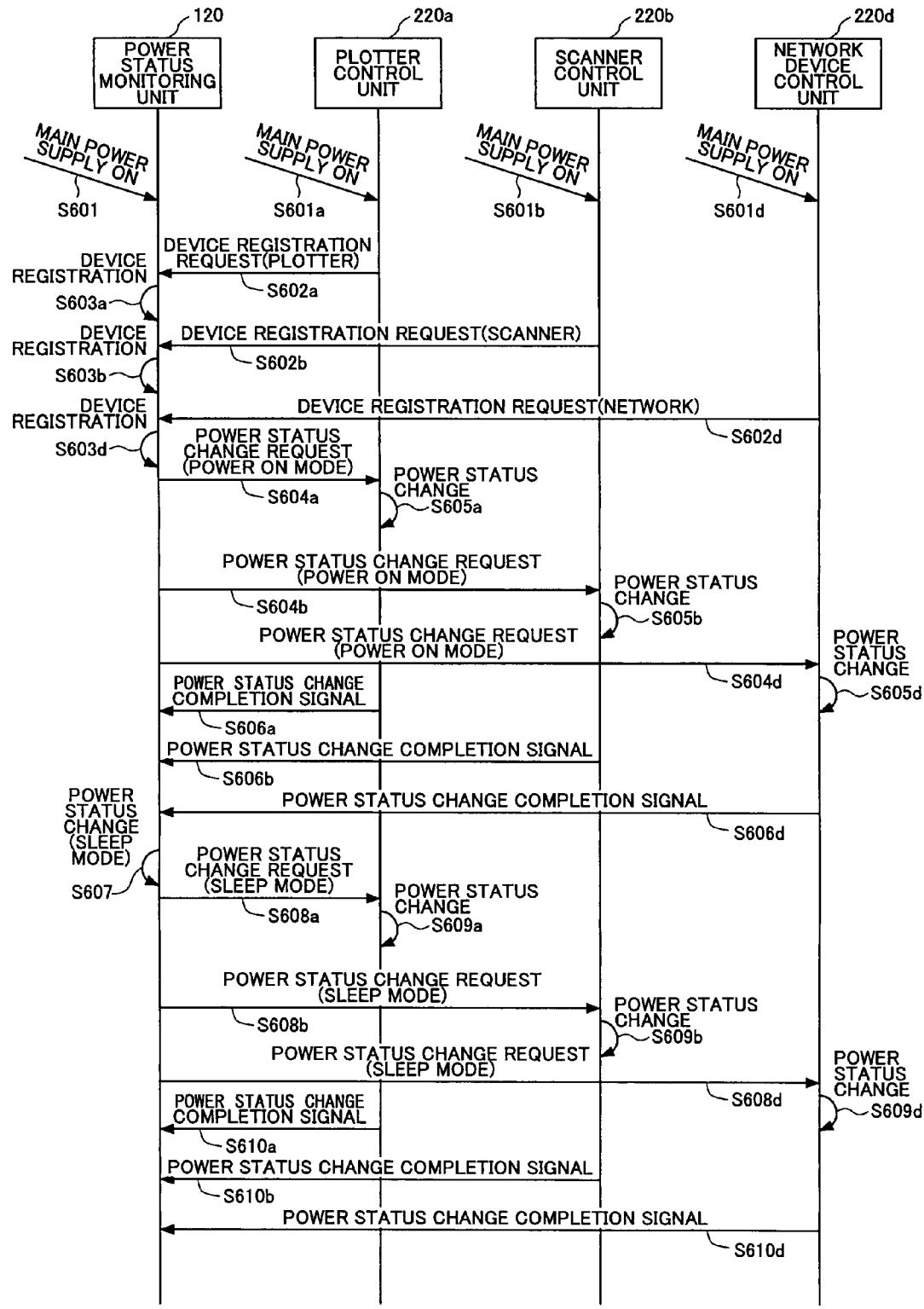
FIG. 8 is a sequence chart illustrating an exemplary process sequence for setting the power mode of a multifunction machine.

FIG. 8 is a sequence chart illustrating exemplary process sequences for setting the power mode of a multifunction machine corresponding to an image processing apparatus according to an embodiment of the present invention. The multifunction machine of FIG. 8 includes a plotter 320*a* (not shown), a scanner 320*b* (not shown), and a network device 320*d* (not shown) as devices to be controlled, and a plotter control unit 220*a*, a scanner control unit 220*b*, and a network device control unit 220*d* as corresponding device control units.

In step S601 of FIG. 8, the main power supply of the multifunction machine is turned on and a power status monitoring unit 120 is activated. In steps S601*a*, S601*b*, and S601*d* that may be performed at the same time as step S601 or after step S601, the plotter control unit 220*a*, the scanner control unit 220*b*, and the network device control unit 220*d* are activated, respectively.

In the process sequence related to the plotter control unit 220*a*, after step S601*a*, the process moves on to step S602*a* where the plotter control unit 220*a* conveys a registration request to the power status monitoring unit 120. After step S602*a*, the process moves on to step S603*a* where device registering means of the power status monitoring unit 120 registers the plotter control unit 220*a*.

In the process sequence related to the scanner control unit 220*b*, after step S601*b*, the process moves on to step S602*b* where the scanner control unit 220*b* conveys a registration request to the power status monitoring unit 120. After step S602*b*, the process moves on to step S603*b* where device registering means of the power status monitoring unit 120 registers the scanner control unit 220*b*.

In the process sequence related to the network device control unit 220*d*, after step S601*d*, the process moves on to step S602*d* where the network device control unit 220*d* conveys a registration request to the power status monitoring unit 120. After step S602*c*, the process moves on to step S603*c* where device registering means of the power status monitoring unit 120 registers the network device control unit 220*d*.

In one embodiment, the plotter/scanner/network device control units 220*a*-220*d* may convey predetermined information to the power status monitoring unit 120 in the registration requesting steps S602*a*-S602*d*. The predetermined information may be information on the type of device controlled by the device control unit or attributes of the device, for example. Attributes of a device may be information indicating whether power status change operations are to be retried after the elapse of a predetermined time period in a case where the status of the device is reset to a previous power status due to an inconsistency between the status of the device acquired by device status acquiring means and the requested power status.

In the process sequence related to the plotter control unit 220*a*, after step S603*a*, the process moves on to step S604*a* where the power status monitoring unit 120 conveys a power status change request to the plotter control unit 220*a* for switching to a power status corresponding to power on mode. After step S604*a*, the process moves on to step S605*a* where the plotter control unit 220*a* switches the power status of the plotter 320*a* (not shown) to power on mode.

In the process sequence related to the scanner control unit 220*b*, after step S603*b*, the process moves on to step S604*b* where the power status monitoring unit 110 conveys a power status change request to the scanner control unit 220*b* for switching to a power status corresponding to power on mode. After step S604*b*, the process moves on to step S605*b* where the scanner control unit 220*b* switches the power status of the scanner 320*b* (not shown) to power on mode.

In the process sequence related to the network device control unit 220*d*, after step S603*d*, the process moves on to step S604*d* where the power status monitoring unit 120 conveys a power status change request to the network device control unit 220*d* for switching to a power status corresponding to power on mode. After step S604*d*, the process moves on to step S605*d* where the network device control unit 220*d* switches the power status of the network device 320*d* (not shown) to power on mode.

In the process sequence related to the plotter control unit 220*a*, after step S605*a*, the process moves on to step S606*a* where the plotter control unit 220*a* conveys a power status change completion signal to the power status monitoring unit 120 indicating that the power status of the plotter 320*a* has been switched to power on mode as requested.

In the process sequence related to the scanner control unit 220*b*, after step S605*b*, the process moves on to step S606*b* where the scanner control unit 220*b* conveys a power status change completion signal to the power status monitoring unit 120 indicating that the power status of the scanner 320*b* has been switched to power on mode as requested.

In the process sequence related to the network device control unit 220*d*, after step S605*d*, the process moves on to step S606*d* where the plotter control unit 220*d* conveys a power status change completion signal to the power status monitoring unit 120 indicating that the power status of the network device 320*d* has been switched to power on mode as requested.

The above process sequences of S501-S506*a*, S501-S506*b*, and S501-S506*c* correspond to transitions of the power status from the time the main power supply of the multifunction machine is turned on to the time the devices of the multifunction machine are activated and switched to power on mode.

In the following, process sequences performed in a case where the multifunction machine is switched from power on mode to sleep mode are described. In step S607, the power status monitoring unit 120 sets the power mode to power off mode. In one example, the power status monitoring unit 120 may set the power mode to sleep mode when output operations are not performed for a predetermine time period during normal mode.

In the process sequence related to the plotter control unit 220*a*, after step S607, the process moves on to step S608*a* where the power status monitoring unit 120 conveys a power status change request to the plotter control unit 220*a* for switching to a power status corresponding to sleep mode.

After step S608a, the process moves on to step S609a where the plotter control unit 220a switches the power status of the plotter 320a (not shown) to sleep mode.

In the process sequence related to the scanner control unit 220b, after step S607, the process moves on to step S608b where the power status monitoring unit 120 conveys a power status change request to the scanner control unit 220b for switching to a power status corresponding to sleep mode. After step S608b, the process moves on to step S609b where the scanner control unit 220b switches the power status of the scanner 320b (not shown) to sleep mode.

In the process sequence related to the network device control unit 220d, after step S607, the process moves on to step S608c where the power status monitoring unit 120 conveys a power status change request to the network device control unit 220d for switching to a power status corresponding to sleep mode. After step S608c, the process moves on to step S609c where the network device control unit 220d switches the power status of the network device 320d (not shown) to sleep mode.

In one embodiment, the power status the network device 320d in sleep mode may be the same as the power status of the network device 320d in normal mode. In such an embodiment, the multifunction machine may be able to receive data via a network even during sleep mode.

After step S609a, the process moves on to step S610a where the plotter control unit 220a conveys a power status change completion signal to the power status monitoring unit 120 indicating that the power status of the plotter 320a has been switched to sleep mode as requested.

After step S609b, the process moves on to step S610b where the scanner control unit 220b conveys a power status change completion signal to the power status monitoring unit 120 indicating that the power status of the scanner 320b has been switched to sleep mode as requested.

After step S609d, the process moves on to step S610d where the network device control unit 220d conveys a power status change completion signal to the power status monitoring unit 120 indicating that the power status of the network device 320d has been switched to sleep mode as requested.

According to one embodiment, in steps S605a, S605b, S605d, S609a, S609b, and S609d, the plotter/scanner/network device control units 220a-220d may be configured to change the statuses of the plotter 320a, the scanner 320b, and the network device 320d, respectively, in the case where the power statuses of these devices 320a-320d acquired by device status acquiring means of the plotter/scanner/network device control units 220a-220d are different from the requested power status.

Figure 9:
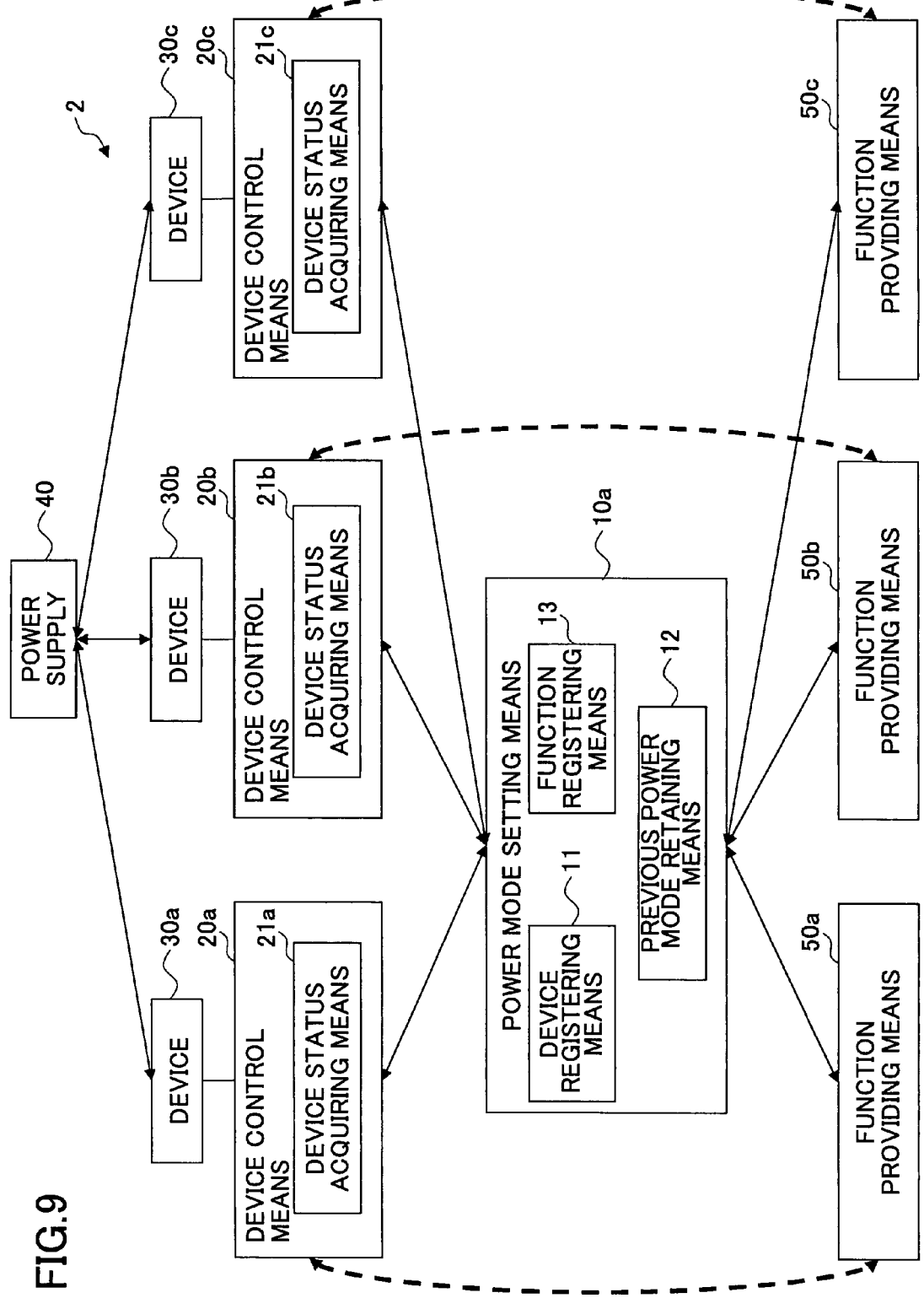
FIG. 9 is a block diagram illustrating an exemplary functional configuration of an image processing apparatus according to a second embodiment of the present invention.

[Second Embodiment]
(FIG. 9)

FIG. 9 is a block diagram illustrating a functional configuration of an image processing apparatus according to a second embodiment of the present invention. In the illustrated image processing apparatus 2 of FIG. 9, the power status of one or more devices is controlled by corresponding device control means according to power modes set by power mode setting means, and corresponding function providing means for the devices provides device functions according to the set power modes.

The image processing apparatus 2 includes power mode setting means 10a, device control means 20a-20c, devices 30a-30c, a power supply 40, and function providing means 50a-50c. It is noted that functional elements of the image processing apparatus 2 according to the second embodiment that are identical to those of the image processing apparatus 1 according to the first embodiment are given the same reference numerals and their descriptions are omitted.

The power mode setting means 10a includes device registering means 11, previous power mode retaining means 12, and function registering means 13. The device registering means 11 is for registering the devices included in the image processing apparatus 2 and attribute information of the devices. The previous power mode retaining means 12 is for storing either the latest power mode or the one before the latest power mode set by the power mode setting means 10a. In this way, when current power mode setting is rejected by one or more of the device control means 20a-20c, the power mode may be reset to the previously set power mode. In one embodiment, the previous power mode retaining means 12 may be configured to store the power mode previously set by the power mode setting means 10a from the time power mode setting operations are started to the time such operations are completed, and at other times, the previous power mode retaining means 12 may be configured to store the current power mode. In this case, the previous power mode retaining means 12 may update the power mode stored therein to the current power mode upon being informed of the completion of power mode change (setting) operations by the function providing means 50a-50c and the device control means 20a-20c, for example.

The function registering means 13 is for registering the function providing means 50a-50c. In one embodiment, the function registering means 13 may be configured to store information on the correspondence between the function providing means 50a-50c and the device control means 20a-20c. In other embodiments, information on the correspondence between the function providing means 50a-50c and the device control means 20a-20c may be stored in the device registering means 11 or some other relevant element of the image processing apparatus 2.

The function providing means 50a-50c is for providing functions to be realized by the devices 30a-30c. In the illustrated example, the function providing means 50a-50c are associated with the devices 20a-20c, respectively, and provide device functions according to the set power mode. In one specific example, the function providing means 50a may output a request signal to the device control means 20a for executing a particular function of the device 30a. In other words, the image processing apparatus 2 according to the present embodiment may have function providing means for each device, for each device control means, and/or for each function to be realized by a device, for example, and the function providing means may be registered in association with the corresponding device, device control means, and/or function realized by the device.

In one embodiment, the function providing means 50a-50c may be configured to provide functions to be realized by the devices 30a-30c based on requests received from an interface unit or a control unit (not shown), for example. In this way, jobs of the image processing apparatus 2 may be executed, for example.

(Correspondence of Units of FIGS. 10-18 to FIG. 9)

Power monitoring unit 100 shown in FIGS. 10-18 corresponds to power mode setting means 10a of FIG. 9. Device control units 200a and 200b shown in FIGS. 10-18 may correspond to any of the device control means 20a-20c of FIG. 9. Service providing units 500a and 500b may correspond to any of the function providing means 50a-50c of FIG. 9.

(FIG. 10)

Figure 10:
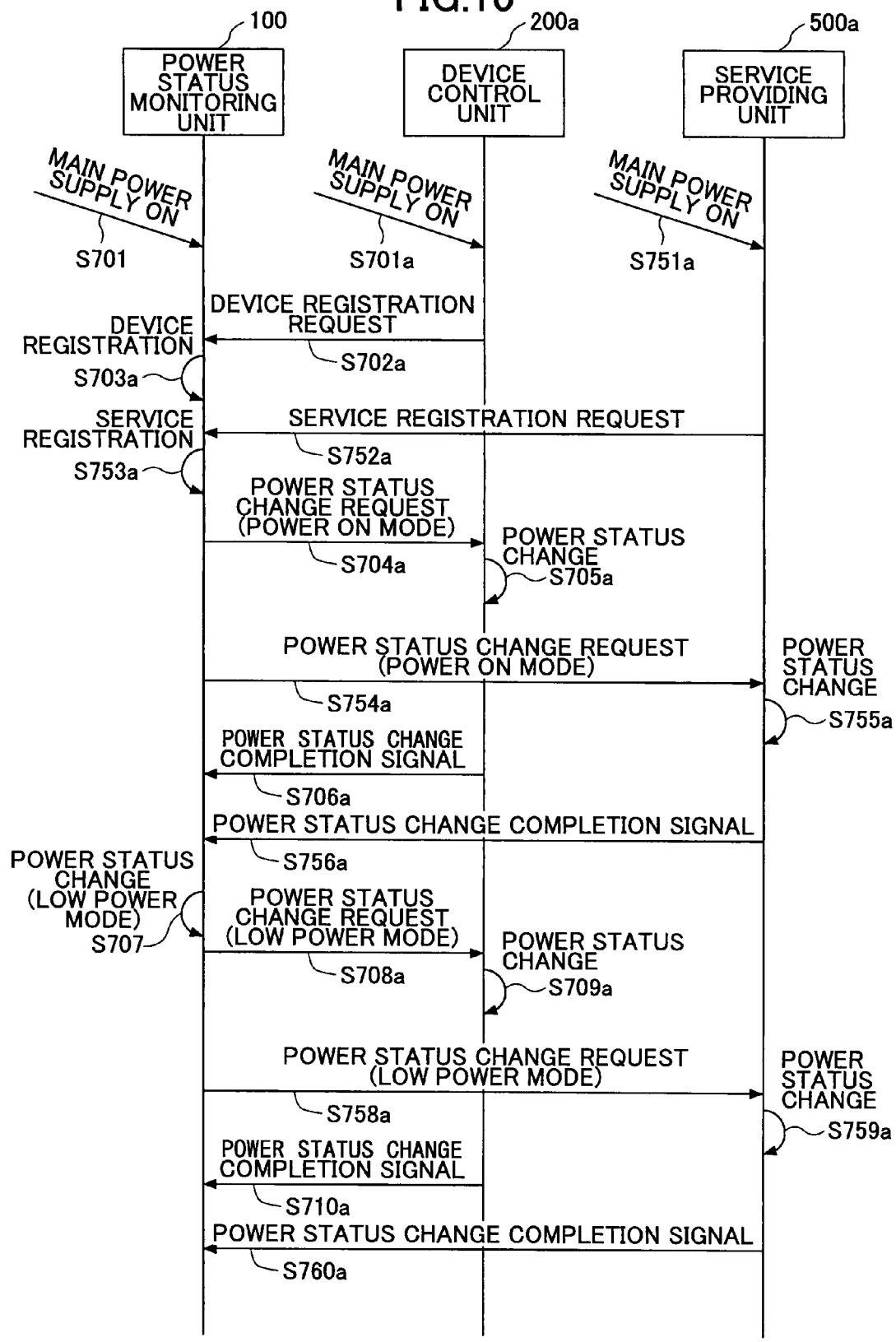
FIG. 10 is a sequence chart illustrating an exemplary process sequence for controlling the power status of the image processing apparatus according to the second embodiment.

FIG. 10 is a sequence chart illustrating a basic power control process sequence of the image processing apparatus according to the second embodiment of the present invention. According to the illustrated example of FIG. 10, when a main power supply of the image processing apparatus is turned on, information on a device included in the image processing apparatus, a device control unit that controls the device, and a service providing unit is registered and a relevant power mode is set. Specifically, in FIG. 10, power mode setting and power status control operations of the image processing apparatus may be performed by having the device control unit 200a and the service providing unit 500a exchange requests and responses with the power monitoring unit 100. It is noted that the device control unit 200a may be configured to control a device 300a (not shown) that is included in the image processing apparatus, for example.

It is noted that in the process sequence from steps S701 to S707, process steps S701a-S706 related to the device control units 200a and process steps S751a-S756a related to the service providing unit 500a may be performed asynchronously. Also, in the process sequence after step S707, process steps S708a-S710a related to the device control unit 200a and the process steps S758a-S760a related to the service providing unit 500a may be performed asynchronously.

In step S701 of FIG. 10, the main power supply is turned on and the power monitoring unit 100 is activated. In steps S701a and S751a that may be performed at the same time as step S701 or after step S701, the device control unit 200a is activated (S701a) and the service providing unit 500a is activated (S751a).

In the process sequence related to the device control unit 200a, after step S701a, the process moves on to step S702a where the device control unit 200a outputs a device registration request to the power status monitoring unit 100. The device registration request may include information on the type of the device 300a controlled by the device control unit 200a and/or attribute information of the device 300a, for example. After step S702a, the process moves on to step S703a where device registering means of the power status monitoring unit 100 registers the device control unit 200a.

After step S703a, the process moves on to step S704a where the power monitoring unit 100 conveys a power status change request to the device control unit 200a for switching to a power status corresponding to power on mode. After step S704a, the process moves on to step S705a where the device control unit 200a sets the power status of its corresponding device 300a (not shown) to power on mode.

After step S705a, the process moves on to step S706a where the device control unit 200a conveys a power status change completion signal to the power status monitoring unit 100 indicating that the power status of the device 300a has been switched to power on mode.

In the process sequence related to the service providing unit 500a, after step S751a, the process moves on to step S752a where the service providing unit 500a conveys a service registration request to the power monitoring unit 100. The service registration request may include information on the type of function provided by the service providing unit 500a and/or attribute information of the function, for example. After step S752a, the process moves on to step S753a where function registering means of the power status monitoring unit 100 registers the service providing unit 500a. In one embodiment, the function registering means may register information associating the service providing unit 500a with the device control unit 200a.

After step S753a, the process moves on to step S754a where the power monitoring unit 100 outputs a power status change request to the service providing unit 500a for switching to a power status corresponding to power on mode. After step S754a, the process moves on to step S755a where the service providing unit 500a changes its power status to power on mode as requested.

After step S755a, the process moves on to step S756a where the service providing unit 500a conveys a power status change completion signal to the power status monitoring unit 100 indicating that the power status of service providing unit 500a has been switched to power on mode as requested.

The above process sequences from step S701 to step S706a and from step S701 to step S756a relate to operations for switching the power statuses of the device control unit 200a and the service providing unit 500a to power on mode.

The process of FIG. 10 may move on to step S707 after a predetermined time period elapses from the completion of steps S706a and S756a. It is noted that information on the predetermined time period may be stored in a storage unit (not shown) of the image processing apparatus 2, or such information may be determined based on values input to the image processing apparatus 2 by a user, for example. In one embodiment, step S707 may be performed when image processing operations or communication operations are not performed in the image processing apparatus 2 for a predetermined time period. In step S707, the power status monitoring unit 100 sets the power mode of the image processing apparatus to low power mode. After step S707, the process moves on to steps S708a and S758a described below.

In the process sequence related to the device control unit 200a, in step S708a, the power monitoring unit 100 outputs a power status change request to the device control unit 200a for switching to a power status corresponding to low power mode. After step S708a, the process moves on to step S709a where the device control unit 200a switches the power status of its corresponding device 300a (not shown) to low power mode. After step S709a, the process moves on to step S710a where the device control unit 200a outputs a power status change completion signal to the power status monitoring unit 100 indicating that the power status of the device 300a has been switched to low power mode as requested.

In the process sequence related to the service providing unit 500a, in step S758a, the power monitoring unit 100 outputs a power status change request to the service providing unit 500a for switching to a power status corresponding to low power mode. After step S758a, the process moves on to step S759a where the service providing unit 500a switches its power status to low power mode. After step S759a, the process moves on to step S760a where the service providing unit 500a outputs a power status change completion signal to the power status monitoring unit 100 indicating that the power status of the service providing unit 500a has been switched to low power mode as requested.

By performing the above process sequences from step S707 to steps S710a and steps S760a, the power statuses of the device 300a of the image processing apparatus 2 and its corresponding service providing unit 500a may be switched from power on mode to low power mode.

According to an aspect of the present embodiment, the power status of a service providing unit that provides a function of a corresponding device and the power status of the corresponding device may be arranged to be the same so that instances in which a request for a function is issued from the service providing unit when the corresponding device is inactive may be reduced, for example, to thereby enable efficient control of the image processing apparatus.

(FIG. 11)

Figure 11:
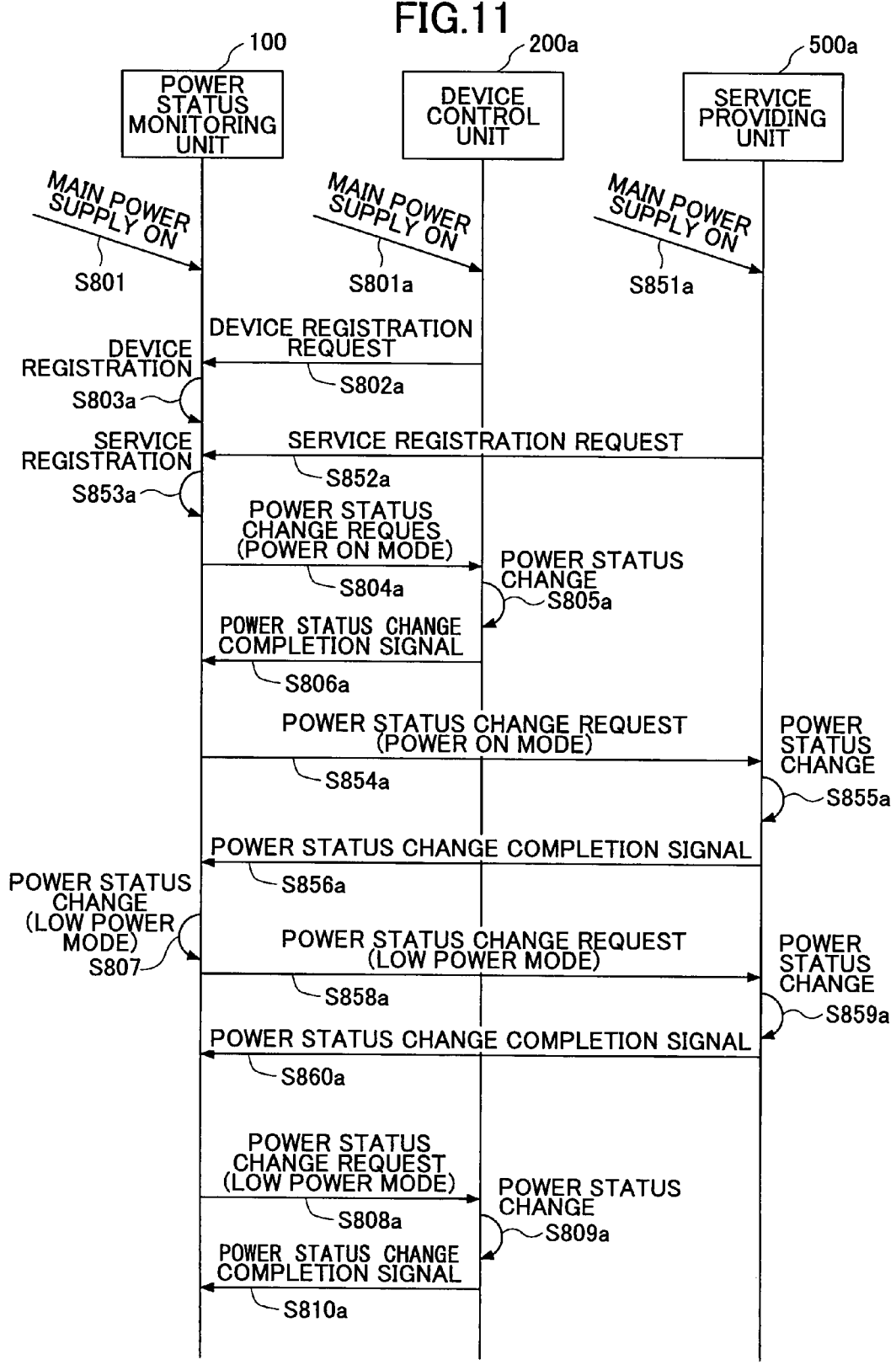
FIG. 11 is a sequence chart illustrating another exemplary process sequence for controlling the power status of the image processing apparatus according to the second embodiment.

FIG. 11 is a sequence chart illustrating another exemplary process sequence of the image processing apparatus according to the second embodiment. In the process sequence of FIG. 11, the order in which power mode setting operations are performed on the device control unit 200a and the service providing unit 500a is fixed. For example, in the case of switching from a higher power consuming power mode to a lower power consuming power mode, if the power status of the device control unit 200a is switched according to such power mode change before the power status of the service providing unit 500a is switched, the service providing unit 500a may issue a request for the execution of a function of a device with respect to the device control unit 200a when the device is already inactive.

In order to prevent such a problem from occurring, in the present example, the power mode of the device control unit 200 is changed after the power mode of the service providing unit 500a is changed in the case of switching the power mode to a lower power consuming power mode, and the power mode of the device control unit 200a is changed before the power mode of the service providing unit 500a is changed in the case of switching the power mode to a higher power consuming power mode.

In this way, a request for use of a function of a device may be prevented from being issued when power status change operations are being performed for changing the power status of a device to a lower power consuming power mode. Also, by arranging a service providing unit to be activated after power is supplied to a corresponding device in the case of switching the power mode to a higher power consuming power mode, a request for use of a function of the device may be prevented from being issued when the corresponding device is still inactive, for example.

In the process sequence of FIG. 11, power mode setting and power control operations of the image processing apparatus 2 may be performed by having the device control unit 200a and the service providing unit 500a exchange requests and responses with the power status monitoring unit 100 as in FIG. 10.

It is noted that in FIG. 10, the process sequence related to the device control unit 200a and the process sequence related to the service providing unit 500a may be performed asynchronously; however, in FIG. 11, the process sequence related to the device control unit 200a and the process sequence related to the service providing unit 500a are synchronized, and the process steps have to be performed in the indicated order.

In step S801 of FIG. 11, the main power supply of the image processing apparatus is turned on and the power monitoring unit 100 is activated. In steps S801a and S851a that may be performed at the same time as step S801 or after step S701, the device control unit 200a is activated (S701a) and the service providing unit 500a is activated (S751a).

After performing step S801a, the process moves on to step S802a where the device control unit 200a outputs a device registration request to the power status monitoring unit 100. The device registration request may include information on the type of the device 300a controlled by the device control unit 200a and/or attribute information of the device 300a, for example. After step S802a, the process moves on to step S803a where device registering means of the power status monitoring unit 100 registers the device control unit 200a.

After performing steps S851a and S803a, the process moves on to step S852a where the service providing unit 500a outputs a service registration request to the power monitoring unit 100. The service registration request may include information on the type of function provided by the service providing unit 500a and/or attribute information of the function, for example. After step S852a, the process moves on to step S853a where function registering means of the power status monitoring unit 100 registers the service providing unit 500a. In one embodiment, the function registering means may register information associating the service providing unit 500a with the device control unit 200a.

After performing step S853a, the process moves on to step S804a where the power monitoring unit 100 outputs a power status change request to the device control unit 200a for switching to a power status corresponding to power on mode. After step S804a, the process moves on to step S805a where the device control unit 200a sets the power status of its corresponding device 300a (not shown) to power on mode.

After step S805a, the process moves on to step S806a where the device control unit 200a outputs a power status change completion signal to the power status monitoring unit 100 indicating that the power status of the device 300a has been switched to power on mode as requested.

After performing step S806a, the process moves on to step S854a where the power monitoring unit 100 outputs a power status change request to the service providing unit 500a for switching to a power status corresponding to power on mode. After step S854a, the process moves on to step S855a where the service providing unit 500a changes its power status to power on mode as requested.

After performing step S855a, the process moves on to step S856a where the service providing unit 500a conveys a power status change completion signal to the power status monitoring unit 100 indicating that the power status of service providing unit 500a has been switched to power on mode as requested.

The above process sequence from step S801 to step S856a relate to operations for switching the power statuses of the device control unit 200a and the service providing unit 500a to power on mode.

It is noted that since the power mode of the service providing unit 500a is to be set to on mode after the power mode of the device control unit 200a is set to on mode in the present process sequence, mediation processes may be simplified between the service providing unit 500a that issues a request for the execution of a function and the device control unit 200a that controls the device 300a having the requested function.

After a predetermined time period elapses from the time step S856a is completed, the process of FIG. 11 may move on to step S807. It is noted that information on the predetermined time period may be stored in a storage unit (not shown) of the image processing apparatus 2, or such information may be determined based on values input to the image processing apparatus 2 by a user, for example. In one embodiment, step S807 may be performed when image processing operations or communication operations are not performed in the image processing apparatus 2 for a predetermined time period. In step S807, the power status monitoring unit 100 sets the power mode to low power mode.

After step S807, the process moves on to step S858a where the power monitoring unit 100 outputs a power status change request to the service providing unit 500a for switching to a power status corresponding to low power mode. After step S858a, the process moves on to step S859a where the service providing unit 500a switches its power status to low power mode. After step S859a, the process moves on to step S860a where the service providing unit 500a outputs a power status change completion signal to the power status monitoring unit 100 indicating that the power status of the service providing unit 500a has been switched to low power mode as requested.

After performing step S860a, the process moves on to step S808a where the power monitoring unit 100 outputs a power status change request to the device control unit 200a for switching to a power status corresponding to low power mode. After step S808a, the process moves on to step S809a where the device control unit 200a switches the power status of its corresponding device 300a (not shown) to low power mode. After step S809a, the process moves on to step S810a where the device control unit 200a outputs a power status change completion signal to the power status monitoring unit 100 indicating that the power status of the device 300a has been switched to low power mode as requested.

By performing the above process sequence from step S807 to step S810a, the power statuses of the device 300a of the image processing apparatus 2 and its corresponding service providing unit 500a may be switched from power on mode to low power mode.

It is noted that by arranging the power mode of the device control unit 200a to be changed after the power mode of the service providing unit 500a is changed in the present process sequence, mediation processes may be simplified between the service providing unit 500a that request for execution of a function of device 300a and the device control unit 200a that control the device 300a, for example.

(FIG. 12)

Figure 12:
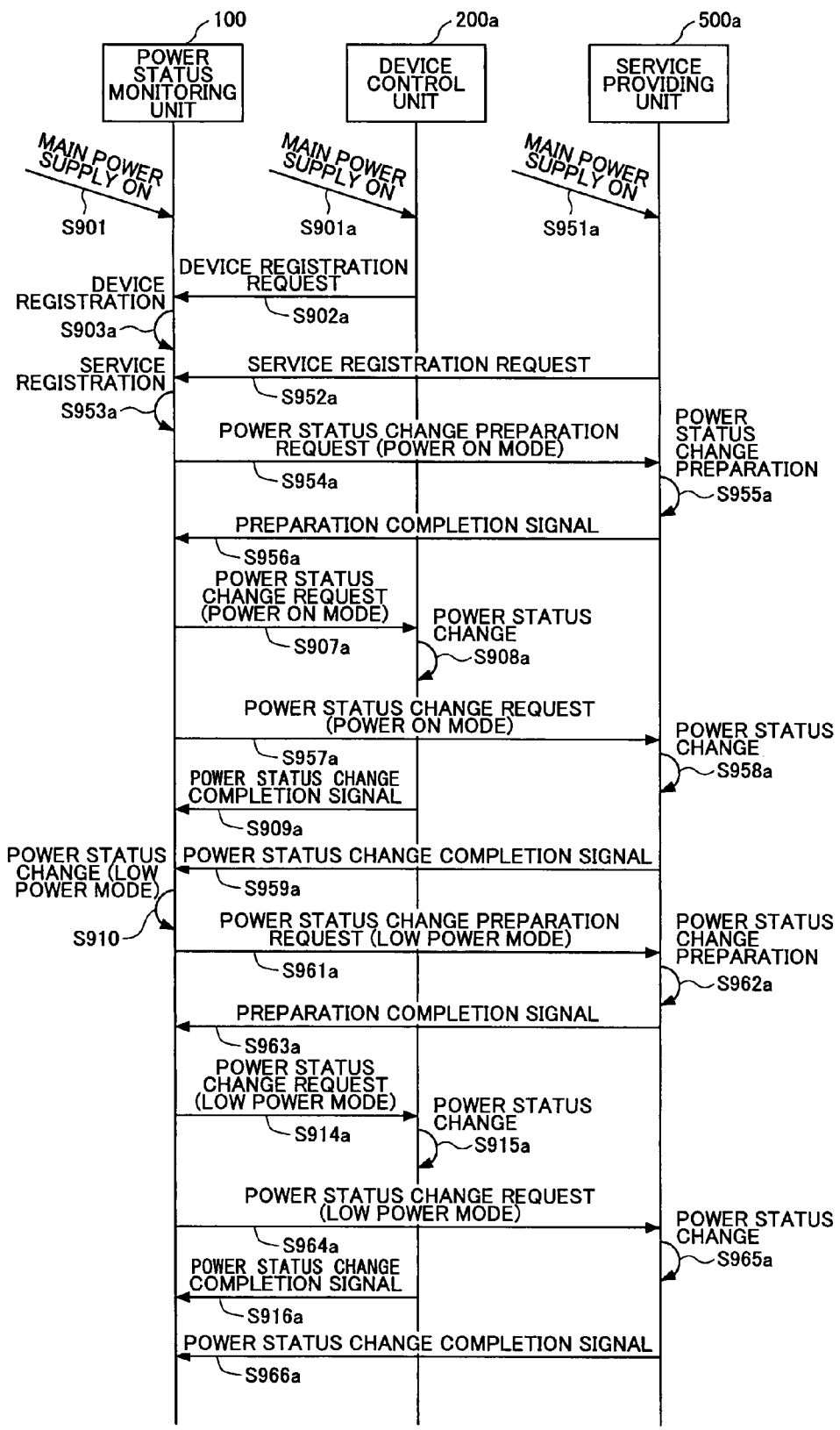
FIG. 12 is a sequence chart illustrating an exemplary process sequence of the image processing apparatus according to the second embodiment that involves issuing a power mode setting preparation request.

FIG. 12 is a sequence chart illustrating an exemplary process sequence that involves outputting a power mode setting preparation request to the service providing unit 500a in order to prevent a device function execution request from being issued during power mode change (setting) operations of the service providing unit 500a and the device control unit 200a.

In the process sequence of FIG. 12, power mode setting and power status control operations are performed by having the device control unit 200a and the service providing unit 500a of the image processing apparatus 2 exchange requests and responses with the power status monitoring unit 100 as in the process sequences of FIGS. 10 and 11.

As is described above, in FIG. 10, the process sequence related to the device control unit 200a and the process sequence related to the service providing unit 500a may be performed asynchronously, whereas in FIG. 11, the process sequence related to the device control unit 200a and the process sequence related to the service providing unit 500a have to be performed synchronously. In FIG. 12, the device control unit 200a and the service providing unit 500a may perform power mode setting operations asynchronously after a power mode setting preparation request is output to the service providing unit 500a. In this way, processes of the device control unit 200a and the service providing unit 500a may be performed in parallel so that the process time may be reduced, for example.

Also, in FIG. 12, the order in which the power setting process sequences of the device control unit 200a and the service providing unit 500a are performed may be the same in both cases of switching to a lower power consuming power mode and switching to a higher power consuming power mode so that mediation between the device control unit 200a and the service providing unit 500a related to power mode setting may be simplified, for example.

It is noted that the process sequence from step S901 to step S953a of FIG. 12 is identical to the process sequence from step S802 to step 853a of FIG. 11 so that descriptions thereof are omitted. Also, the process sequences from step S901 to step S903a of FIG. 12 and the process sequence from step S901 to step S953a of FIG. 12 may be identical to the process sequence from step S701 to step S703a of FIG. 10 and the process sequence from step S701 to step S753a of FIG. 10, respectively, for example.

In step S954a of FIG. 12, the power status monitoring unit 100 outputs a power status change preparation request (power setting preparation request) to the service providing unit 500a. After step S954a, the process moves on to step S955a where the service providing unit 500a stops operations for requesting execution of a device function based on the preparation request received in step S954a. In another example, the service providing unit 500a may be controlled to refrain from receiving any request for executing a device function from another unit such as a control unit (not shown) in response to receiving the preparation request. After step S955, the process moves on to step S956 where the service providing unit 500a outputs a power status change preparation completion signal to the power status monitoring unit 100.

After step S956a, the process moves on to step S907a and/or step S957a. It is noted that the process sequence from step S907a to step S909a related to the device control unit 200a may be identical to the process sequence from step S704a to step S706a of FIG. 10 so that descriptions thereof are omitted. Also, the process sequence from step S957a to step S959a related to the service providing unit 500a may be identical to the process sequence from step S754a to step S756a of FIG. 10 so that descriptions thereof are omitted. Further, it is noted that the process sequence from step S907a to step S909a and the process sequence from step S957a to step S959a may be performed asynchronously.

After performing step S909a and/or step S959a, the process moves on to step S910. In step S910, the power status monitoring unit 100 sets the power mode to low power mode when image processing operations or communication operations are not performed at the image processing apparatus 2 for a predetermined time period, for example.

After step S910, the process moves on to step S961a where the power status monitoring unit 100 outputs a power status change preparation request to the service providing unit 500a. After step S961a, the process moves on to step S962a where the service providing unit 500a stops operations for requesting execution of a device function based on the preparation request received in step S961a. In another example, the service providing unit 500a may be controlled to refrain from receiving a device function execution request from another unit such as a control unit (not shown). After step S962a, the process moves on to step S963a where the service providing unit 500a outputs a power status change preparation completion signal to the power status monitoring unit 100.

After step S963a, the process moves on to step S914a and/or step S964a. It is noted that the process sequence from step S914a to step S916a related to the device control unit 200a may be identical to the process sequence from step S708a to step S710a of FIG. 10 so that descriptions thereof are omitted. Also, the process sequence from step S964a to step S966a related to the service providing unit 500a may be identical to the process sequence from step S758a to step S760a of FIG. 10 so that descriptions thereof are omitted. Further, it is noted that the process sequence from step S914a to step S916a and the process sequence from step S964a to step S966a may be performed asynchronously.

(FIG. 13)

Figure 13:
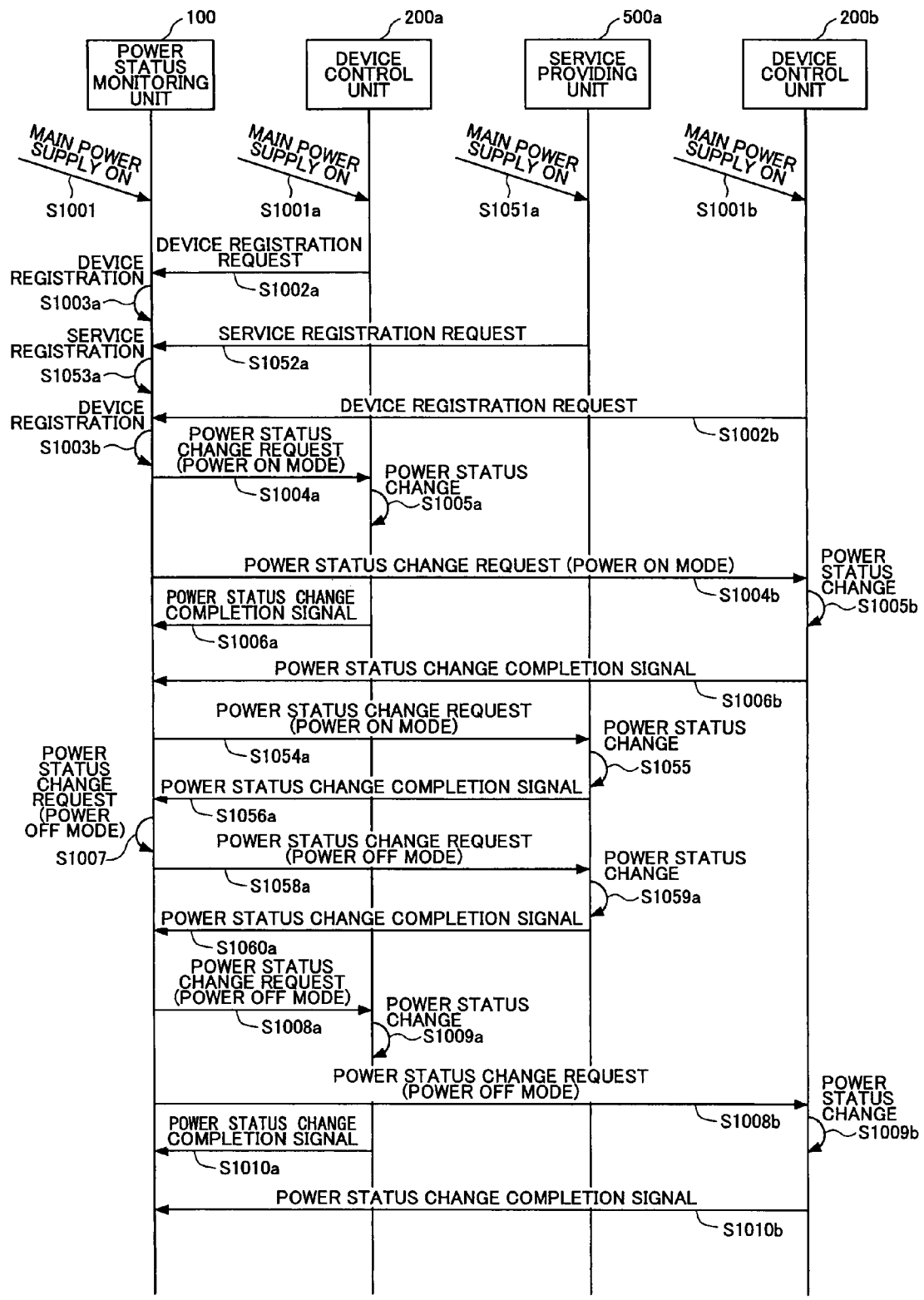
FIG. 13 is a sequence chart illustrating an exemplary process sequence of the image processing apparatus according to the second embodiment in a case where an additional device is included in the image processing apparatus.

FIG. 13 is a sequence chart illustrating another exemplary process sequence of the image processing apparatus 2 according to the second embodiment in a case where an additional device is included. In FIG. 13, when the main power supply of the image processing apparatus 2 is turned on, the devices included in the image processing apparatus 2, the device control units 200a and 200b that control these devices, and the function providing unit 500a are registered and a relevant power mode is set. It is noted that in the process sequence of FIG. 13, power mode setting and power status control operations of the image processing apparatus 2 may be performed by having the device control units 200*a*, 200*b*, and the service providing unit 500*a* exchange requests and responses with the power status monitoring unit 100. In the following descriptions, it is assumed that the device control unit 200*a* is configured to control device 300*a* (not shown), and the device control unit 200*b* is configured to control device 300*b* (not shown).

In FIG. 13, the process sequence from step S1001*a* to step S1010*a* related to the device control unit 200*a* and the process sequence from step S1051*a* to step S1060*a* related to the service providing unit 500*a* are substantially similar to the process sequence from step S701*a* to step S710*a* related to the device control unit 200*a* of FIG. 10 and the process sequence from step S751*a* to step S760*a* related to the service providing unit 500*a* of FIG. 10, respectively, so that descriptions of the identical steps are omitted. However, it is noted that in the process of FIG. 13, in step S1007, the power mode is set to power off mode by the power status monitoring unit 100, and the subsequent process steps relate to power mode setting operations for setting the power mode to power off mode as opposed to the lower power mode.

Also, it is noted that the process sequence related to the device control unit 200*b* is substantially identical to the process sequence related to the device control unit 200*a*. That is, the process sequences of the device control units 200*a* and 200*b* may be identical aside from the difference in the devices they control and the attribute information of theses devices, and thereby descriptions of the process sequence of the device control unit 200*b* are omitted.

It is noted that within the process sequence from step S1001 to step S1007, the process sequence from step S101*a* to step S1006*a* related to the device control unit 200*a*, the process sequence from step S1051*a* to step S1056*a* related to the service providing unit 500*a*, and the process sequence from step S101*b* to step S1006*b* related to the device control unit 200*b* may be performed asynchronously. Also, within the process sequence after step S1007, the process sequence from step S1008*a* to step S101*a* related to the device control unit 200*a*, the process sequence from step S1058*a* to step S1060*a* related to the service providing unit 500*a*, and the process sequence from step S1008*b* to step S1010*b* related to the device control unit 200*b* may be performed asynchronously.

As can be appreciated from the above descriptions of the process of FIG. 13, even when a device and its corresponding device control unit is added to the image processing apparatus 2, power status setting operations may be adequately performed within the image processing apparatus 2 by having information of the added device and device control unit registered in the power status monitoring unit 100.

(FIG. 14)

Figure 14:
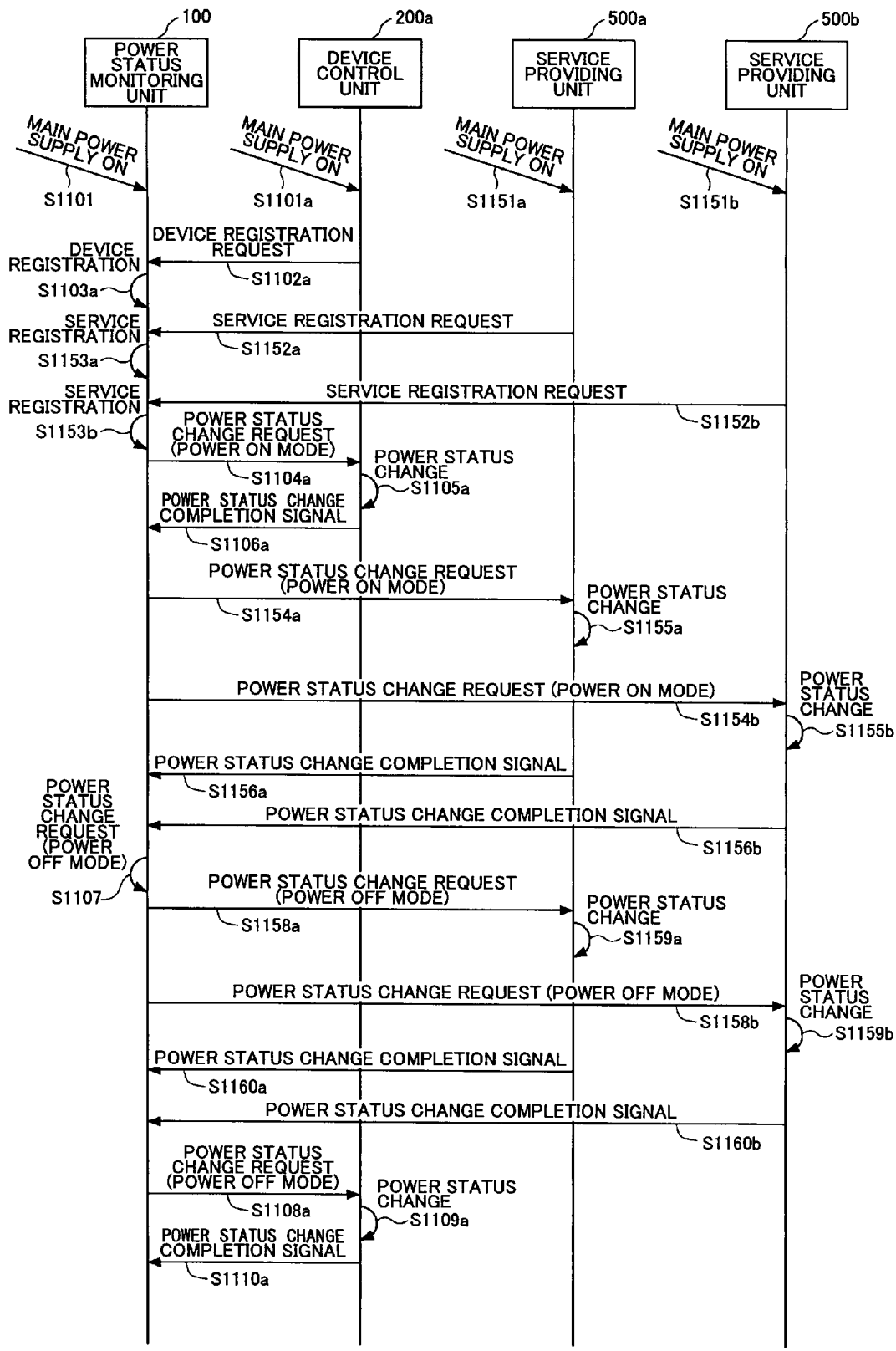
FIG. 14 is a sequence chart illustrating an exemplary process sequence of the image processing apparatus according to the second embodiment in a case where an additional service providing unit is included in the image processing apparatus.

FIG. 14 is a sequence chart illustrating another exemplary process sequence of the image processing apparatus 2 according to the second embodiment in a case where an additional service providing unit is included. In FIG. 14, when the main power supply of the image processing apparatus 2 is turned on, the device of the image processing apparatus 2, the device control unit 200*a* that controls this device, and the function providing units 500*a* and 500*b* that provide the functions of the device are registered and a relevant power mode is set. It is noted that in the process sequence of FIG. 14, power mode setting and power status control operations of the image processing apparatus 2 may be performed by having the device control unit 200*a* and the service providing units 500*a* and 500*b* exchange requests and responses with the power status monitoring unit 100. In the following descriptions, it is assumed that the device control unit 200*a* is configured to control device 300*a* (not shown).

In FIG. 14, the process sequence from step S1101*a* to step S1110*a* related to the device control unit 200*a* and the process sequence from step S1151*a* to step S1160*a* related to the service providing unit 500*a* are substantially similar to the process sequence from step S701*a* to step S710*a* related to the device control unit 200*a* of FIG. 10 and the process sequence from step S751*a* to step S760*a* related to the service providing unit 500*a* of FIG. 10, respectively, so that descriptions of the identical steps are omitted. However, it is noted that in the process of FIG. 14, in step S1107, the power mode is set to power off mode by the power status monitoring unit 100, and the subsequent process steps relate to power mode setting operations for setting the power mode to power off mode as opposed to the lower power mode.

Also, it is noted that the process sequence related to the service providing unit 500*b* is substantially identical to the process sequence related to the service providing unit 500*a*. That is, the process sequences of the service providing units 500*a* and 500*b* may be identical aside from the difference in the device functions they provide, and thereby descriptions of the process sequence of the a service providing unit 500*b* are omitted.

It is noted that within the process sequence from step S1101 to step S1107, the process sequence from step S1101*a* to step S1106*a* related to the device control unit 200*a*, the process sequence from step S1151*a* to step S1156*a* related to the service providing unit 500*a*, and the process sequence from step S1151*b* to step S1156*b* related to the service providing unit 500*b* may be performed asynchronously. Also, within the process sequence after step S1107, the process sequence from step S1108*a* to step S1110*a* related to the device control unit 200*a*, the process sequence from step S1158*a* to step S1160*a* related to the service providing unit 500*a*, and the process sequence from step S1158*b* to step S1160*b* related to the service providing unit 500*b* may be performed asynchronously.

As can be appreciated from the above descriptions of the process of FIG. 14, even when a service providing unit is added to the image processing apparatus 2, power status setting operations may be adequately performed within the image processing apparatus 2 by having information of the added service providing unit registered in the power status monitoring unit 100.

(FIG. 15)

Figure 15:
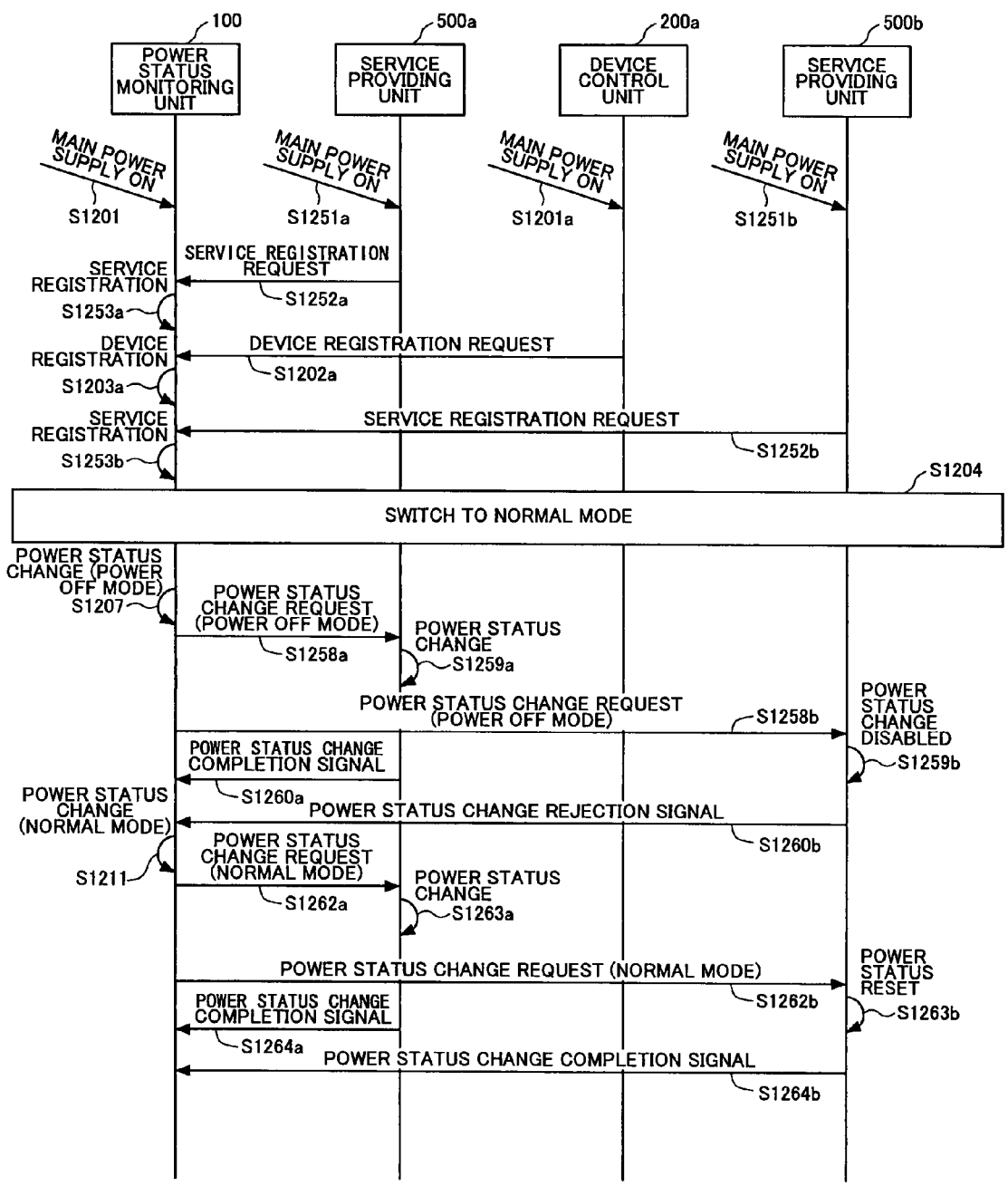
FIG. 15 is a sequence chart illustrating an exemplary process sequence of the image processing apparatus according to the second embodiment in a case where the power status of a service providing unit cannot be changed to the requested power status.

FIG. 15 is a sequence chart illustrating another exemplary process sequence of the image processing apparatus 2 according to the second embodiment in a case where the service providing unit is unable to switch its power status to that corresponding to a requested power mode. In FIG. 15, when the main power supply of the image processing apparatus 2 is turned on, the device of the image processing apparatus 2, the device control unit 200*a* that controls this device, and the function providing units 500*a* and 500*b* that provide the functions of the device are registered and a relevant power mode is set. It is noted that in the process sequence of FIG. 15, power mode setting and power status control operations of the image processing apparatus 2 may be performed by having the device control unit 200*a* and the service providing units 500*a* and 500*b* exchange requests and responses with the power status monitoring unit 100. In the following descriptions, it is assumed that the device control unit 200*a* is configured to control device 300*a* (not shown).

It is noted that the process sequence from step S1201*a* to step S1210*a* related to the device control unit 200*a* of FIG. 15 may be identical to the process sequence from step S701*a* to step S710*a* related to the device control unit 200*a* of FIG. 10. Also, the process sequence from step S1251*a* to step S1260*a* related to the service providing unit 500a and the process sequence from step S1251b to step S1260b related to the service providing unit 500b may be identical to the process sequence from step S751a to step S760a related to the service providing unit 500a of FIG. 10. Therefore, descriptions of these process steps are omitted.

In step S1207, the power status monitoring unit 100 sets the power mode to power off mode. After step S1207, the process moves on to steps S1258a and S1258b.

In step S1258a related to the service providing unit 500a, the power status monitoring unit 100 outputs a power status change request to the service providing unit 500a for switching to a power status corresponding to power off mode. After step S1258a, the process moves on to step 1259a where the service providing unit 500a switches its power status to power off mode. After step S1259a, the process moves on to step S1260a where the service providing unit 500a outputs a power status change completion signal to the power status monitoring unit 100 indicating that the power status of the service providing unit 500a has been switched to power off mode.

In step S1258b related to the service providing unit 500b, the power status monitoring unit 100 outputs a power status change request to the service providing unit 500b for switching to a power status corresponding to power off mode. After step S1258b, the process moves on to step S1259b where the service providing unit 500b attempts to switch its power status to power off mode. However, in the present example, the power mode of the service providing unit 500b cannot be switched to the desired power status corresponding to power off mode so that a determination to such effect (power status change disabled) is made in step S1259b. After step S1259b, the process moves on to step S1260b where the service providing unit 500b outputs a power status change rejection signal to the power status monitoring unit 100 indicating that the power status of the service providing unit 500b cannot be switched to power off mode.

After step S1260b, the process moves on to step S1211 where the power status monitoring unit 100 resets the power mode to normal mode. After step S1211, the process moves on to steps S1262a and S1262b.

In step S1262a related to the service providing unit 500a, the power monitoring unit 100 outputs a power status change request to the service providing unit 500a for switching to a power status corresponding to normal mode. After step S1262a, the process moves on to step S1263a where the service providing unit 500a switches its power status to normal mode. After step S1263a, the process moves on to step S1264a where the service providing unit 500a outputs a power status change completion signal to the power status monitoring unit 100 indicating that the power status of the service providing unit 500a has been switched to normal mode.

In step S1262b related to the service providing unit 500b, the power monitoring unit 100 outputs a power status change request to the service providing unit 500b for switching to a power status corresponding to normal mode. After step S1262b, the process moves on to step S1263b where the service providing unit 500b resets its power status to normal mode. In another embodiment, step S1263b may be omitted since the power status of the service providing unit 500b is already in normal mode, and the process may proceed directly to step S1264b.

After step S1263b (or step S1262b in the case where step S1263b is skipped), the process moves on to step S1264a where the service providing unit 500b outputs a power status change completion signal to the power status monitoring unit 100 indicating that the power status of the service providing unit 500b has been switched to normal mode.

It is noted that after step S1264b, operations may be performed for setting the power status of the device control unit 200a to normal mode, for example. In the example of FIG. 15, the power status monitoring unit 100 does not output a power status change request to the device control unit 200a since the power status of the device control unit 200a is already in normal mode. In this way, the number of process steps may be reduced and the process time for completing a job of the image processing apparatus may be reduced, for example.

As can be appreciated from the above descriptions, according to the present example, when the power status of one service providing unit cannot be switched to a desired power status corresponding to a currently requested power mode, the power statuses of the other service providing units and device control units may be reset to the previous power mode set before the currently requested power mode.

(FIG. 16)

Figure 16:
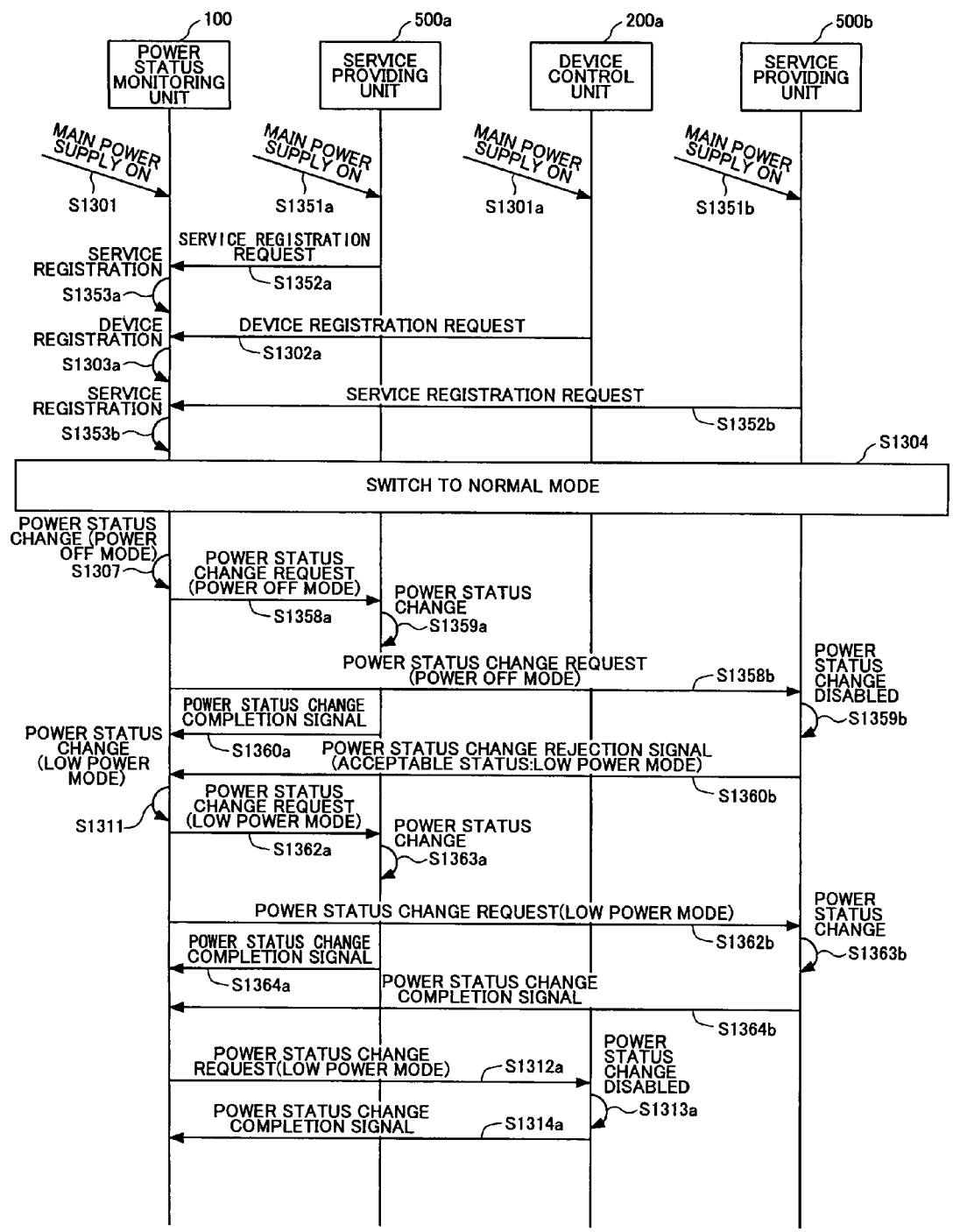
FIG. 16 is a sequence chart illustrating another exemplary process sequence of the image processing apparatus according to the second embodiment in the case where the power status of a service providing unit cannot be changed to the requested power status.

FIG. 16 is a sequence chart illustrating another exemplary process sequence of the image processing apparatus 2 according to the second embodiment in the case where the service providing unit is unable to switch its power status to a desired power status corresponding to the requested power mode. In the process of FIG. 16, the service providing unit that is unable to switch its power status to the desired power status is configured to inform the power status monitoring unit of the power status to which is can be switched.

It is noted that the process sequence from step S1301 to step S1304 of FIG. 16 may be identical to the process sequence from step S1201 to step S1204 of FIG. 15 so that descriptions there of are omitted.

In step S1307 of FIG. 16, the power status monitoring unit 100 sets the power mode to power off mode. After step S1307, the process moves on to steps S1358a and S1358b.

In step S1358a related to the service providing unit 500a, the power status monitoring unit 100 outputs a power status change request to the service providing unit 500a for switching to a power status corresponding to power off mode. After step S1358a, the process moves on to step S1359a where the service providing unit 500a switches its power status to power off mode. After step S1359a, the process moves on to step S1360a where the service providing unit 500a outputs a power status change completion signal to the power status monitoring unit 100 indicating that the power status of the service providing unit 500a has been switched to power off mode.

In step S1358b related to the service providing unit 500b, the power status monitoring unit 100 outputs a power status change request to the service providing unit 500b for switching to a power status corresponding to power off mode.

After step S1358b, the process moves on to step S1359b where the service providing unit 500b attempts to switch its power status to power off mode. However, in the present example, the power status of the service providing unit 500b cannot be switched to power off mode so that a determination to such effect (power status change disabled) is made in step S1359b. Further, in the present example, the power mode corresponding to an acceptable power status for the service providing unit 500b is selected. Specifically, the low power mode is selected in the present case.

It is noted that the acceptable power status refers to the power status to which the service providing unit 500b may be set. In one embodiment, if the requested power mode specified in the power status change request to the service providing unit 500b is a lower power consuming power mode with respect to the currently set power mode, a lower power consuming power mode of the power modes corresponding to the acceptable power statuses for the service providing unit 500*b* may be selected. If the requested power mode specified in the power status change request to the service providing unit 500*b* is a higher power consuming power mode with respect to the currently set power mode, a higher power consuming power mode of the power modes corresponding to the acceptable power statuses for the service providing unit 500*b* may be selected. Further, it is noted that a power mode that is closest to the requested power mode is preferably selected from the power modes corresponding to the acceptable power statuses for the service providing unit 500*b*.

After step S1359*b*, the process moves on to step S1360*b* where the service providing unit 500*b* outputs a power status change rejection signal to the power status monitoring unit 100 indicating that the power status of the service providing unit 500*b* cannot be switched to power off mode. It is noted that the power status change rejection signal output in step S1360*b* includes information on the power mode selected in step S1359*b*.

After step S1360*b*, the process moves on to step S1311 where the power status monitoring unit 100 sets the power status to low power mode corresponding to the selected power mode specified in the power status change rejection signal output in step S1360. After step S1311, the process moves on to steps S1362*a* and S1362*b*.

In step S1362*a* related to the service providing unit 500*a*, the power status change unit 100 outputs a power status change request to the service providing unit 500*a* for switching to a power status corresponding to low power mode. After step S1362*a*, the process moves on to step S1363*a* where the service providing unit 500*a* sets its power status to low power mode. After step S1363*a*, the process moves on to step S1364*a*, where the service providing unit 500*a* outputs a power status change completion signal to the power status monitoring unit 100 indicating that the power status of the service providing unit 500*a* has been switched to low power mode.

In step S1362*b* related to the service providing unit 500*b*, the power status change unit 100 outputs a power status change request to the service providing unit 500*b* for switching to a power status corresponding to low power mode. After step S1362*b*, the process moves on to step S1363*b* where the service providing unit 500*b* sets its power status to low power mode. After step S1363*b*, the process moves on to step S1364*b* where the service providing unit 500*b* outputs a power status change completion signal to the power status monitoring unit 100 indicating that the power status of the service providing unit 500*b* has been switched to low power mode.

After step S1364*b*, the process moves on to step S1312*a* where the power status monitoring unit 100 outputs a power status change request to the device control unit 200*a* for switching to a power mode corresponding to low power mode. After step S1312*a*, the process moves on to step S1313*a* where the device control unit 200*a* switches the power status of its corresponding device 300*a* (not shown) to low power mode. After step S1313*a*, the process moves on to step S1314*a* where the device control unit 200*a* outputs a power status change completion signal to the power status monitoring unit 100 indicating that the power status of the device 300*a* has been switched to low power mode.

According to the present example, when the power status of a given service providing unit cannot be switched to a desired power status corresponding to the requested power mode, the power statuses of all the service providing units and device control units of the image processing apparatus may be switched to an acceptable power status to which the given service providing unit can be switched.

(FIG. 17)

Figure 17:
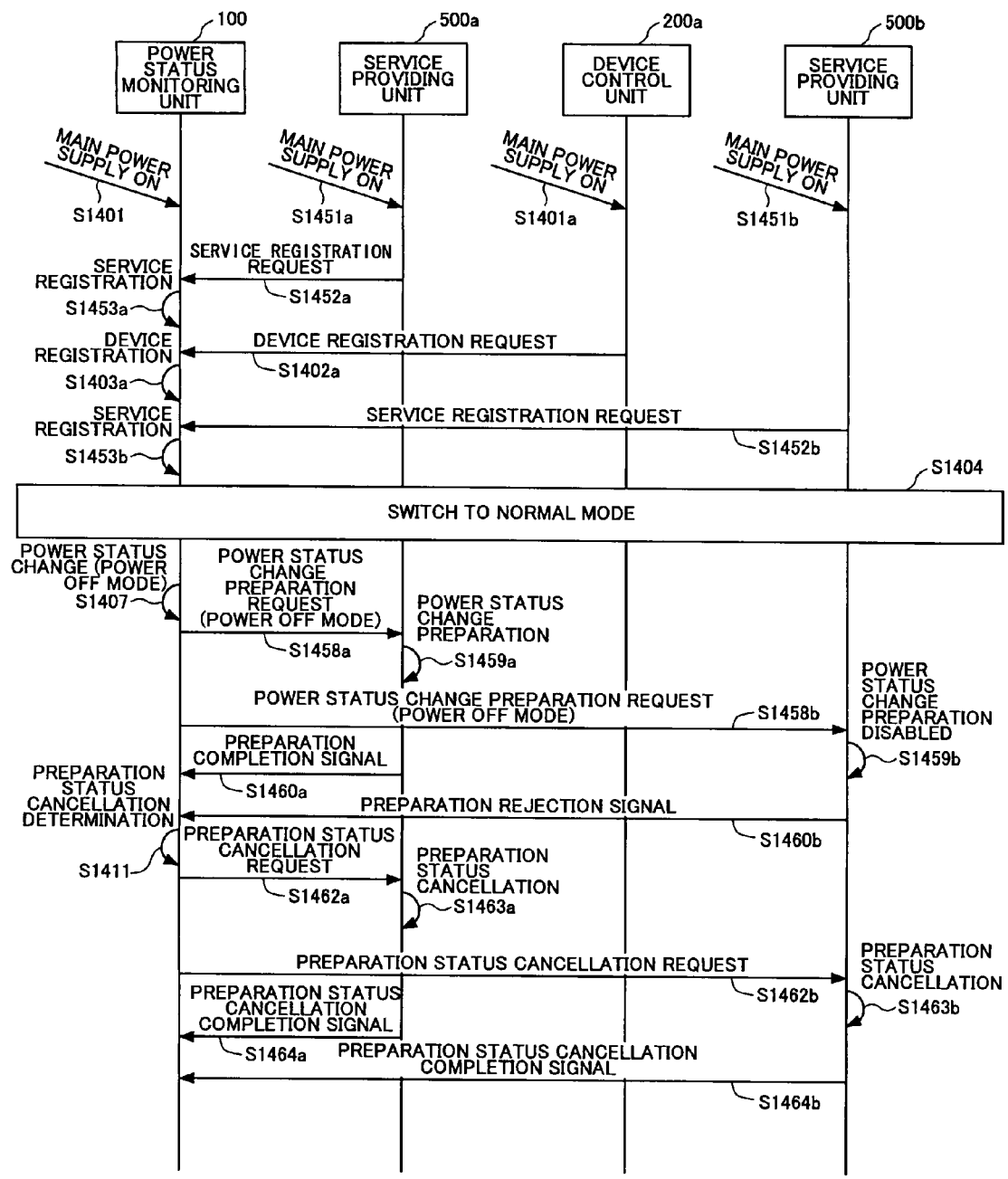
FIG. 17 is a sequence chart illustrating an exemplary process sequence of the image processing apparatus according to the second embodiment in a case where a service providing unit cannot be switched to power status change preparation status in response a power status change preparation request.

FIG. 17 is a sequence chart illustrating another exemplary process sequence of the image processing apparatus 2 according to the second embodiment in the case where the power status of a service providing unit cannot be switched to a desired power status corresponding to the requested power mode. In the example of FIG. 17, a power status change preparation request is output before a power status change request.

It is noted that the process sequence from step S1401 to step S1404 of FIG. 17 may be identical to the process sequence from step S1201 to step S1204 of FIG. 15 so that descriptions there of are omitted.

In step S1407 of FIG. 17, the power status monitoring unit 100 sets the power mode to power off mode. After step S1407, the process moves on to steps S1458*a* and S1458*b*.

In step S1458*a* related to the service providing unit 500*a*, the power status monitoring unit 100 outputs a preparation request to the service providing unit 500*a* for switching to a power status corresponding to power off mode. After step S1458*a*, the process moves on to step S1459*a* where the service providing unit 500*a* stops accepting new requests for execution of a device function, for example, as preparation for switching to the power status corresponding to power off mode. After step S1459*a*, the process moves on to step S1460*a* where the service providing unit 500*a* outputs a preparation completion signal to the power status monitoring unit 100 indicating that preparations for switching to a power status corresponding to power off mode have been completed within the service providing unit 500*a*.

In step S1458*b* related to the service providing unit 500*b*, the power status monitoring unit 100 outputs a preparation request to the service providing unit 500*b* for switching to a power status corresponding to power off mode.

After step S1458*b*, the process moves on to step S1459*b* where the service providing unit 500*b* attempts to stop accepting new requests for execution of a device function, for example, as preparation for switching to the power status corresponding to power off mode. However, in the present example, the status of the service providing unit 500*b* cannot be switched to preparation status so that a determination to such effect (power status change preparation disabled) is made in step S1459*b*.

After step S1459*b*, the process moves on to step S1460*b* where the service providing unit 500*b* outputs a preparation rejection signal to the power status monitoring unit 100 indicating that the status of the service providing unit 500*b* cannot be switched to preparation status as requested.

After step S1460*b*, the process moves on to step S1411 where the power status monitoring unit 100 makes a determination to cancel the preparation status for switching to the power status corresponding to power off mode in response to the preparation rejection signal received in step S1460*b*. After step S1411, the process moves on to step S1462*a*.

In step S1462*a* related to the service providing unit 500*a*, the power status monitoring unit 100 outputs a power status change preparation cancellation request to the service providing unit 500*a*. After step S1462*a*, the process moves on to step S1463*a* where the service providing unit 500*a* cancels the preparation status to which it has been switched in step S1459*a*. For example, the service providing unit 500*a* may start accepting new requests for execution of a device function.

After step S1463*a*, the process moves on to step S1464*a* where the service providing unit 500*a* outputs a preparation status cancellation completion signal to the power status monitoring unit 100 indicating that the preparation status of the service providing unit 500*a* has been cancelled.

It is noted that the process sequence from step S1462*b* to step S1464*b* related to the service providing unit 500*b* may be identical to the process sequence from step S1462*a* to steps 1464*a* related to the service providing unit 500*a* so that descriptions thereof are omitted. In one embodiment, the process sequence from step S1462*b* to step S1464*b* may be omitted. That is, preparation status cancellation operations may be omitted for a service providing unit that has not been switched to preparation status so that process operations may be simplified, for example.

(FIG. 18)

Figure 18:
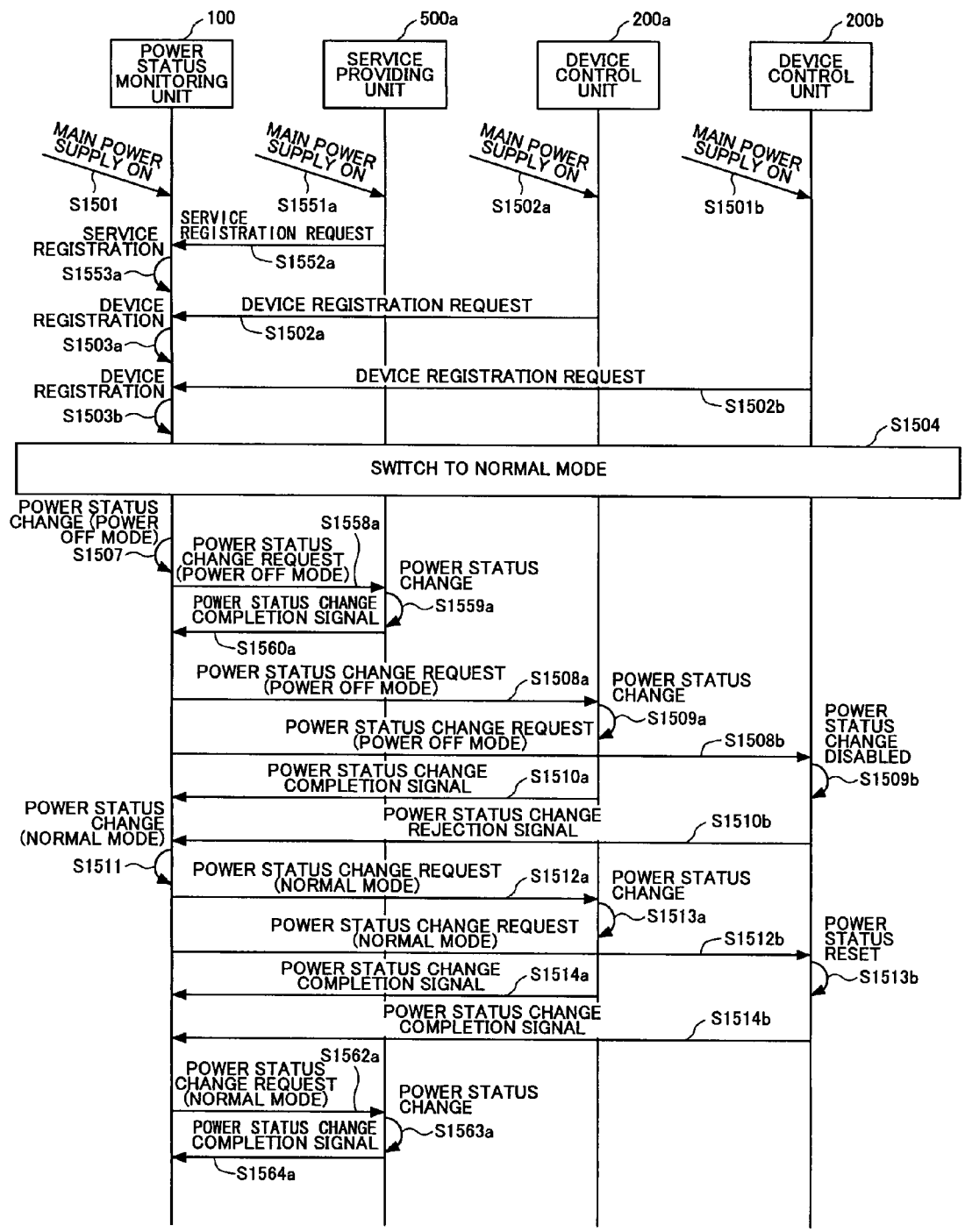
FIG. 18 is a sequence chart illustrating an exemplary process sequence of the image processing apparatus according to the second embodiment in a case where the power status of a device cannot be changed to the requested power status.

FIG. 18 is a sequence chart illustrating another exemplary process sequence of the image processing apparatus 2 according to the second embodiment in the case where the power status of a device control unit cannot be switched to a desired power status corresponding to the requested power mode.

It is noted that the process sequence from step S1501*a* to step S1504 related to the device control unit 200*a* and the process sequence from step S1501*b* to step S1504 related to the device control unit 200*b* of FIG. 18 are identical to the process sequence from step S701*a* to step S706*a* related to the device control unit 200*a* of FIG. 10 so that descriptions thereof are omitted.

Also, it is noted that the process sequence from step S1251*a* to step S1260*a* related to the service providing unit 500*a* of FIG. 18 may be identical to the process sequence from step S751*a* to step S756*a* related to the service providing unit 500*a* of FIG. 10 so that descriptions thereof are omitted.

Also, it is noted that the process sequence from step S1507 to step S1514*a* related to the device control unit 200*a* may be identical to the process sequence from step S307 to step S314*b* related to the device control unit 200*b* of FIG. 4, and the process sequence from step S1507 to step S1514*b* related to the device control unit 200*b* of FIG. 18 may be identical to the process sequence from step S307 to step S314*b* related to the device control unit 200*c* of FIG. 4 so that descriptions thereof are omitted.

Further, the process sequence from step S1507 to step S1564*a* related to the service providing unit 500*a* of FIG. 18 may be identical to the process sequence from step as 1207 to step S1264*a* related to the service providing unit 500*a* of FIG. 15 so that descriptions thereof are omitted.

In the process of FIG. 18, when the power status of the device control unit 200*b* cannot be switched to power off mode in step S1509*b*, the power statuses of the device control unit 200*a* and the service providing 500*a* may be switched back to normal mode.

(FIG. 19)

Figure 19:
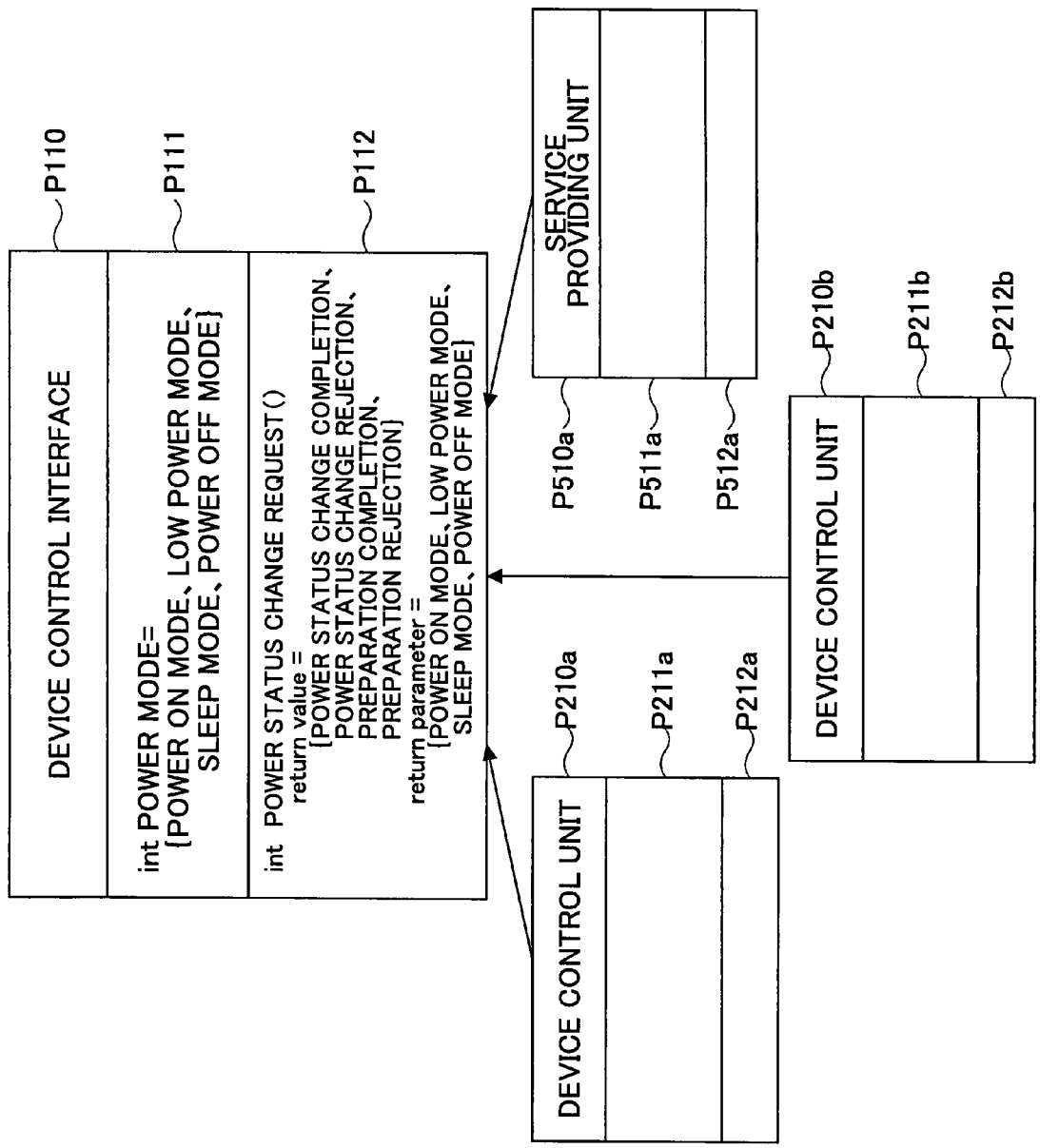
FIG. 19 is a diagram illustrating another exemplary configuration of a computer program according to an embodiment of the present invention.

FIG. 19 is a diagram illustrating another exemplary configuration of a device control program according to an embodiment of the present invention. In the illustrated example of FIG. 19, 'power mode' is defined as a common value in a device control interface part P110. The 'power mode' is equivalent to one of the values of 'power on mode', 'low power mode', 'sleep mode', and 'power off mode'. The value of the 'power mode' is inherited in device control parts P210*a*, P210*b* and service providing part P510*a* and reflected in these parts P210*a*, P210*b*, and P510*a*.

To perform power mode setting or change operations, a power status change request is issued according to specifications described in device control interface P112. Power status setting parts P212*a*, P212*b*, and P512*a* that are included in the device control parts P211*a*, P211*b*, and the service providing unit 510*a*, respectively, are configured to perform power status setting operations based on programs adapted for controlling their corresponding devices and convey the results of the operations as return values to the device control interface P112. The device control interface is configured to receive a value representing 'power status change completion', 'power status change rejection', 'preparation completion', or 'preparation rejection' as the return value. In one embodiment, when the operations result correspond to 'power status change rejection' or 'preparation rejection', a value representing 'power on mode', 'low power mode', 'sleep mode', or 'power off mode' may be added as a return parameter representing an acceptable power mode.

It is noted that the device control interface P110 may be a program for enabling a computer to function as power mode setting means according to an embodiment of the present invention, the device control parts P210*a* and P210*b* may be programs for enabling a computer to function as device control means according to an embodiment of the present invention, and the service providing part P510*a* may be a program for enabling a computer to function as function providing means according to an embodiment of the present invention.

(Configuration of Computer)

Figure 20:
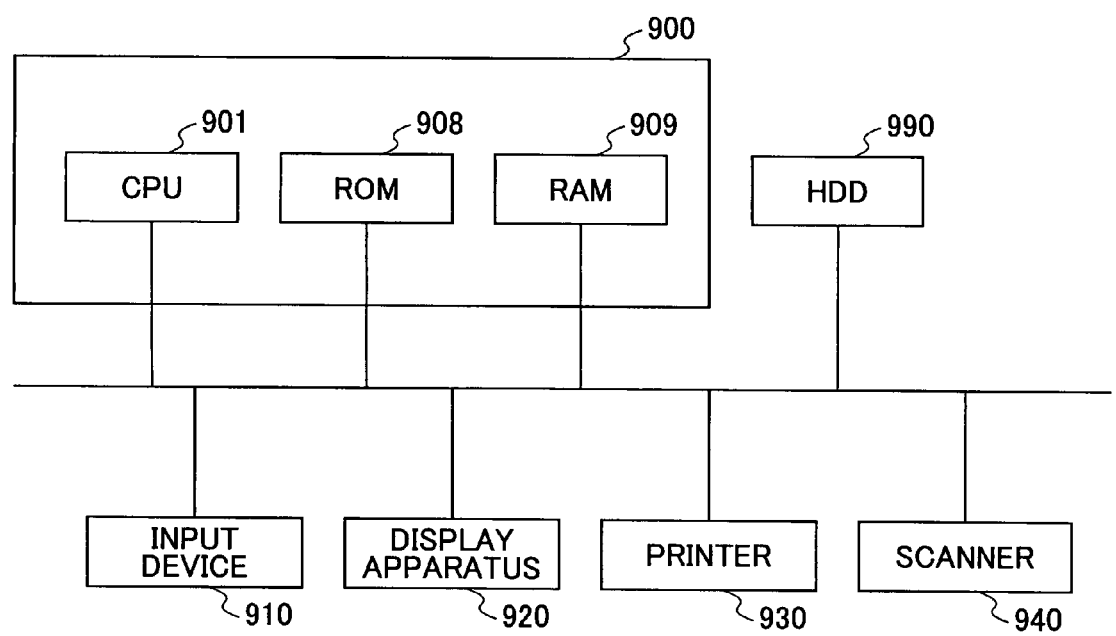
FIG. 20 is a block diagram illustrating a configuration of a computer that functions as an image processing apparatus according to an embodiment of the present invention.

FIG. 20 is a diagram showing a configuration of a computer that functions as an image processing apparatus according to an embodiment of the present invention. The illustrated computer of FIG. 20 as an image processing apparatus according to an embodiment of the present invention includes a main processing unit 900, an input device 910, a display apparatus 920, a printer 930, a scanner 940, and a HDD 990. The main processing unit 900 is for executing functions of the computer and includes an CPU 901, a ROM 908, and a RAM 909. The CPU 901 may execute a computer program according to an embodiment of the present invention by reading the computer program from the ROM 908 and developing the read program on the RAM 909, for example. The ROM 908 may be a nonvolatile memory that stores programs to be executed by the CPU 901 and parameters for controlling the image processing apparatus, for example. The RAM 909 may be a working memory to be used by the CPU 901 during operation.

The input device 910 may be a keyboard or some other input interface that is used by an operator upon inputting instructions to the image processing apparatus, for example. The display apparatus 920 may be configured to indicate the status of the image processing apparatus, for example. The printer 930 may be an apparatus that forms an image on a medium and outputs the image, for example. The scanner 940 may be an apparatus that optically reads an image formed on a medium, for example. The HDD 990 may be a storage device for storing large amounts of data such as image data.

A computer program according to an embodiment of the present invention may be stored in the HDD 990, the ROM 908, or some other computer-readable medium (not shown) including a removable storage medium that may be loaded into a drive apparatus (not shown) of the computer, for example.

In the following, exemplary advantages that may be realized by embodiments of the present invention are described.

An image processing apparatus according to an embodiment of the present invention may include plural devices, device control means associated with each of the devices for controlling a power status of each of the devices according to a relevant power mode, and power mode setting means for setting the relevant power mode to the device control means.

In this way, when a device of the image processing apparatus is added or changed, control means associated with the added/changed device may be added/changed accordingly so that power control may be adequately performed on the devices of the image processing apparatus, for example.

In one preferred embodiment, the power mode setting means may include device registering means for registering the device control means based on a device registration request issued by the device control means.

In this way, a device connected to the image processing apparatus may be registered for power control based on a device registration request from the device control means so that power control may be adequately performed on the devices of the image processing apparatus regardless of whether devices subject to power control are determined beforehand, for example.

In another preferred embodiment, the device control means may issue the device registration request when a power supply of the device control means is turned on or when the device control means is newly added in conjunction with addition of a new device to the devices.

In this way, device registration information of the image processing apparatus may be updated when the power supply of a device is turned on or when a new device is added, for example.

In another preferred embodiment, the device registration request may include attribute information pertaining to an attribute of a corresponding device of the devices controlled by the device control means;
the device registering means may register the attribute information; and
the power mode setting means may set the relevant power mode based on the attribute information registered by the device registering means.

In this way, a relevant power mode may be set according to attributes of the devices connected to the image processing apparatus, for example.

In another preferred embodiment, the power mode setting means may set the relevant power mode to the device control means that is registered in the device registering means.

In this way, the relevant power mode may be set to device control means that has been registered to inform the power mode setting means of the connection of its associated device to the image processing apparatus, for example.

In another preferred embodiment, the power mode setting means may include previous power mode retaining means for storing a previous power mode that is previously set;
the device control means may include device status acquiring means for acquiring a status of a corresponding device of the devices associated with the device control means; and
when the status of the corresponding device acquired by the device status acquiring means is not consistent with the relevant power mode set by the power mode setting means, the device control means may issue a power status change rejection signal to the power mode setting means, and the power mode setting means may set the relevant power mode to the previous power mode based on the power status change rejection signal.

In this way, when the status of a connected device is not consistent with a requested power mode specified in a power mode setting request, the power mode of the image processing apparatus may be set to the previous power mode, for example.

In another preferred embodiment, the image processing apparatus of the present embodiment may include function providing means associated with each of device functions of the devices; wherein
the power mode setting means sets the relevant power mode to the function providing means.

In this way, a relevant power mode may be set to an application for executing a function of a device connected to the image processing apparatus, for example.

In another preferred embodiment, the power mode setting means may include function registering means for registering the function providing means in association with the device control means controlling the devices having the device functions associated with the function providing means based on a function registration request issued by the function providing means.

In this way, an application for executing a function of a device connected to the image processing apparatus may be associated with the device control means that controls this device, and a relevant power mode may be set to the application and the device control means accordingly, for example.

In another preferred embodiment, the function providing means may issue the function registration request when a power supply of the function providing means is turned on, or when the function providing means is newly added.

In this way, application (function) registration information of the image processing apparatus may be updated when an application is turned on or added, for example.

In another preferred embodiment, when switching the relevant power mode from a currently set first power mode to a second power mode for decreasing power consumption with respect to the first power mode, the power mode setting means may set the second power mode to the function providing means before setting the second power mode to the device control means associated with the function providing means; and
when switching the relevant power mode from the currently set first power mode to a third power mode for increasing power consumption with respect to the first power mode, the power mode setting means may set the third power mode to the device control means before setting the third power mode to the function providing means associated with the device control means.

In this way, operations of an application may be stopped before stopping operations of a corresponding device in the case of switching to a lower power consuming power mode, and a device may be activated before a corresponding application is activated in the case of switching to a higher power consuming power mode so that mediation operations between an application and a device control unit may be simplified, for example.

In another preferred embodiment, when setting the relevant power mode to the function providing means, the power mode setting means may issue a power mode setting preparation request before issuing a power setting request to the function providing means; and
the function providing means may stop providing a corresponding device function of the device functions associated with the function providing means based on the power setting preparation request.

In this way, a request for a device function may be prevented from being issued during power mode change operations so that mediation operations between an application and a device control unit may be further simplified, for example.

In another preferred embodiment, when a status of the function providing means is not consistent with the relevant power mode set by the power mode setting means, the function providing means may inform the power setting means of an acceptable power mode that is consistent with the status of the function providing means.

In this way, the power setting means may set the power status of the function providing means and the device control means according to the information on the acceptable power mode, for example.

It is noted that embodiments within the scope of the present invention include an image processing apparatus, a power control method to be executed by an image processing apparatus, a computer program that is executed by a computer to perform a power control method, and a computer-readable medium containing such a computer program. The computer program may be embodied in any computer-readable medium for carrying or having computer-executable instructions or data structures stored thereon. Such a computer-readable medium can be any available medium which can be accessed by a general purpose or a special purpose computer. By way of example, and not limitation, such a computer-readable medium can comprise a physical storage medium such as a RAM, a ROM, an EEPROM, a CD-ROM, other optical disk storage devices, other magnetic storage devices, or any other medium which can be used to carry or store desired program code means in the form of computer-executable instructions or data structures and which can be accessed by a general purpose or special purpose computer. Such a medium may include a wireless carrier signal, for example. When information is transferred or provided over a network or other communications connection (either hardwired, wireless, or combinations thereof) to a computer, the computer properly views the connection as a computer-readable medium. Thus, any such connection is properly termed a computer-readable medium. Combinations of the above should also be included within the scope of the computer-readable medium. Computer-executable instructions comprise, for example, instructions and data which cause a general purpose computer, a special purpose computer, or a processing device to perform a certain function or a group of functions.

Although the present invention is shown and described with respect to certain preferred embodiments, it is obvious that equivalents and modifications may occur to others skilled in the art upon reading and understanding the specification. The present invention includes all such equivalents and modifications, and is limited only by the scope of the claims.

The present application is based on and claims the benefit of the earlier filing date of Japanese Patent Application No. 2006-192963 filed on Jul. 13, 2006, and Japanese Patent Application No. 2007-110854 filed on Apr. 19, 2007, the entire contents of which are hereby incorporated by reference.

What is claimed is:

1. An image processing apparatus comprising:
a plurality of devices for realizing a plurality of functions of the image processing apparatus;
a plurality of device control units, each specific device control unit of the plurality of device control units being associated with a specific corresponding device of the plurality of devices to control a power status of the specific corresponding device according to a relevant power mode; and
a power mode setting unit configured to set the relevant power mode to the specific device control unit,
wherein a power status corresponding to the power mode set by the power mode setting unit is variable for the plurality of devices, depending on the specific device,
wherein the power mode set by the power mode setting unit is selected from a group including low power mode, sleep mode, power on mode and power off mode, and in at least one instance, is the low power mode, and
wherein in at least one instance, the specific device control unit determines, in response to the power mode being set to the power off mode by the power mode setting unit while the corresponding device controlled by the specific device control unit is in the power on mode, that the power off mode is not consistent with current operations of the device, and sets the device to the low power mode and not to the power off mode.

2. The image processing apparatus as claimed in claim 1, wherein the power mode setting unit includes a device registering unit configured to register the specific device control unit based on a device registration request issued by the specific device control unit, and
wherein the specific device control unit issues the device registration request when a power supply of the specific device control unit is turned on or when the specific device control unit is newly added in conjunction with addition of a new device to the devices.

3. The image processing apparatus as claimed in claim 1, wherein
the power mode setting unit includes a device registering unit configured to register the specific device control unit based on a device registration request issued by the specific device control unit;
the device registration request includes attribute information pertaining to an attribute of the specific corresponding device controlled by the specific device control unit;
the device registering unit registers the attribute information; and
the power mode setting unit sets the relevant power mode based on the attribute information registered by the device registering unit.

4. The image processing apparatus as claimed in claim 1, wherein the power mode setting unit includes a device registering unit configured to register the specific device control unit based on a device registration request issued by the specific device control unit, and
wherein the power mode setting unit sets the relevant power mode to the specific device control unit that is registered in the device registering unit.

5. The image processing apparatus as claimed in claim 1, wherein
the power mode setting unit includes a previous power mode retaining unit configured to store a previous power mode that is previously set;
the specific device control unit includes device status acquiring unit configured to acquire a status of the specific corresponding device associated with the specific device control unit; and
when the status of the specific corresponding device acquired by the device status acquiring unit is not consistent with the relevant power mode set by the power mode setting unit, the device control unit issues a power status change rejection signal to the power mode setting unit, and the power mode setting unit sets the relevant power mode to the previous power mode based on the power status change rejection signal.

6. The image processing apparatus as claimed in claim 1, further comprising:
a function providing unit associated with each of device functions of the devices; wherein
the power mode setting unit sets the relevant power mode to the function providing unit.

7. The image processing apparatus as claimed in claim 6, wherein the power mode setting unit includes a function registering unit configured to register the function providing unit in association with the device control unit controlling the device having the device function associated with the function providing unit based on a function registration request issued by the function providing unit, and wherein the function providing unit issues the function registration request when a power supply of the function providing unit is turned on, or when the function providing unit is newly added.

8. The image processing apparatus as claimed in claim 6, wherein when switching the relevant power mode from a currently set first power mode to a second power mode for decreasing power consumption with respect to the first power mode, the power mode setting unit sets the second power mode to the function providing unit before setting the second power mode to the device control unit associated with the function providing unit; and when switching the relevant power mode from the currently set first power mode to a third power mode for increasing power consumption with respect to the first power mode, the power mode setting unit sets the third power mode to the device control unit before setting the third power mode to the function providing unit associated with the device control unit.

9. The image processing apparatus as claimed in claim 6, wherein when setting the relevant power mode to the function providing unit, the power mode setting unit issues a power mode setting preparation request before issuing a power setting request to the function providing unit; and the function providing unit stops providing a corresponding device function of the device functions associated with the function providing unit based on the power setting preparation request.

10. The image processing apparatus as claimed in claim 6, wherein when a status of the function providing unit is not consistent with the relevant power mode set by the power mode setting unit, the function providing unit informs the power setting unit of an acceptable power mode that is consistent with the status of the function providing unit.

11. The image processing apparatus as claimed in claim 1, wherein the power status of the specific corresponding device is independent of the power status of the other ones of the plurality of devices, and in at least some instance, the specific corresponding device has a power status that is not the same as each of the other ones of the plurality of devices.

12. The image processing apparatus as claimed in claim 1, wherein at least one device of the plurality of devices is configured to receive information from an external device without delay when in the low power mode and while having lower power consumption than when in the power on mode.

13. The image processing apparatus as claimed in claim 1, wherein at least one particular device of the plurality of devices is configured to receive data from an external device while in the sleep mode and having lower power consumption than when in the power on mode.

14. An image processing apparatus comprising:

a plurality of devices for realizing a plurality of functions of the image processing apparatus;

plural device control means, each specific device control means of the plural device control means being associated with a specific corresponding device of the plurality of devices for controlling a power status of the specific corresponding device according to a relevant power mode; and power mode setting means for setting the relevant power mode to the specific device control means, wherein a power status corresponding to the power mode set by the power mode setting means is variable for the plurality of devices, depending on the specific device, wherein the power mode set by the power mode setting means is selected from a group including low power mode, sleep mode, power on mode and power off mode, and in at least one instance, is the low power mode, and wherein in at least one instance, the specific device control means determines, in response to the power mode being set to the power off mode by the power mode setting means while the corresponding device controlled by the specific device control means is in the power on mode, that the power off mode is not consistent with current operations of the device, and sets the device to the low power mode and not to the power off mode.

15. A power control method for controlling power of an image processing apparatus that includes a plurality of devices for realizing a plurality of functions of the image processing apparatus, and a plurality of device control units, each specific device control unit of the plurality of device control units being associated with a specific corresponding device of the plurality of devices, the method comprising:

a device controlling step for controlling, by said each specific device control unit of the plurality of device control units, a power status of the specific corresponding device associated with the specific device control unit, according to a relevant power mode of the image processing apparatus; and a power mode setting step for setting the relevant power mode to the specific device control unit, wherein a power status corresponding to the power mode set in the power mode setting step is variable for the plurality of devices, depending on the specific device, and wherein the power mode set in the power mode setting step is selected from a group including low power mode, sleep mode, power on mode and power off mode, and in at least one instance, is the low power mode, and wherein in at least one instance, the specific device control unit determines, in response to the power mode being set to the power off mode in the power mode setting step while the corresponding device controlled by the specific device control unit is in the power on mode, that the power off mode is not consistent with current operations of the device, and sets the device to the low power mode and not to the power off mode.

16. The power control method as claimed in claim 15, wherein the power mode setting step includes a device registration requesting step for issuing a device registration request for registering the specific device control unit; and a device registering step for registering the specific device control unit based on the device registration request.

17. The power control method as claimed in claim 15, wherein the power mode setting step includes a step of storing a previous power mode in a previous power mode retaining unit;

the device controlling step includes a device status acquiring step for acquiring a status of the specific corresponding device of the devices associated with the device control unit; and when the status of the specific corresponding device acquired in the device status acquiring step is not consistent with the relevant power mode set in the power mode setting step, a power status change rejection signal with respect to the power mode setting step is issued in the device controlling step; and the relevant power mode is set to the previous power mode based on the power status change rejection signal in the power mode setting step.

18. The power control method as claimed in claim 15, wherein the power mode setting step includes a step of setting the relevant power mode to a function providing unit associated with each of device functions of the devices included in the image processing apparatus;

a function registration requesting step for issuing a function registration request for registering the function providing unit; and a function registering step for registering the function providing unit in association with the device control unit controlling the device having the device function associated with said function providing unit based on the function registration request.

19. The power control method as claimed in claim 15, wherein the power mode setting step includes a step of setting the relevant power mode to a function providing unit associated with each of device functions of the devices included in the image processing apparatus, and a function power mode setting step for setting the relevant power mode to the function providing unit and a device power mode setting step for setting the relevant power mode to the device control unit associated with the function providing unit;

when switching the relevant power mode from a currently set first power mode to a second power mode for decreasing power consumption with respect to the first power mode, the function power mode setting step is performed before the device power mode setting step; and when switching the relevant power mode from the currently set first power mode to a third power mode for increasing power consumption with respect to the first power mode, the device power mode setting step is performed before the function power mode setting step.

* * * * *